(12) United States Patent
Peng et al.

(10) Patent No.: US 11,272,304 B2
(45) Date of Patent: Mar. 8, 2022

(54) METHOD AND TERMINAL FOR PLAYING AUDIO DATA, AND STORAGE MEDIUM THEREOF

(71) Applicant: GUANGZHOU KUGOU COMPUTER TECHNOLOGY CO., LTD., Guangzhou (CN)

(72) Inventors: Xuejie Peng, Guangzhou (CN); Jiaze Liu, Guangzhou (CN); Yufei Wang, Guangzhou (CN)

(73) Assignee: GUANGZHOU KUGOU COMPUTER TECHNOLOGY CO., LTD., Guangzhou (CN)

( * ) Notice: Subject to any disclaimer, the term of this patent is extended or adjusted under 35 U.S.C. 154(b) by 177 days.

(21) Appl. No.: 16/617,926

(22) PCT Filed: Nov. 28, 2018

(86) PCT No.: PCT/CN2018/117916
§ 371 (c)(1),
(2) Date: Nov. 27, 2019

(87) PCT Pub. No.: WO2019/237667
PCT Pub. Date: Dec. 19, 2019

(65) Prior Publication Data
US 2021/0274301 A1 Sep. 2, 2021

(30) Foreign Application Priority Data
Jun. 12, 2018 (CN) .......................... 201810603069.1

(51) Int. Cl.
*H04S 1/00* (2006.01)
*G06F 3/16* (2006.01)
(Continued)

(52) U.S. Cl.
CPC .............. *H04S 1/007* (2013.01); *G06F 3/165* (2013.01); *G10L 19/02* (2013.01); *G10L 19/032* (2013.01);
(Continued)

(58) Field of Classification Search
CPC . H04S 1/007; H04S 7/301; H04S 7/30; H04S 7/307; H04S 7/308; H04S 2420/07;
(Continued)

(56) References Cited

U.S. PATENT DOCUMENTS

2010/0321216 A1   12/2010  Jonsson et al.
2011/0081024 A1*  4/2011  Soulodre ................... H04S 7/30
                                                                                              381/17
(Continued)

FOREIGN PATENT DOCUMENTS

CN       102623040 A    8/2012
CN       102752687 Y   10/2012
(Continued)

OTHER PUBLICATIONS

Elliott, "Adjust your Phone or Tablets Audio Balance for Better Listening", CNet, Apr. 5, 2016 https://www.cnet.com/tech/mobile/adjust-your-phone-or-tablets-audio-balance-for-better-listening/ (Year: 2016).*
(Continued)

*Primary Examiner* — Yogeshkumar Patel
(74) *Attorney, Agent, or Firm* — Ice Miller LLP

(57) ABSTRACT

The present disclosure provides a method for playing audio data, and belongs to the field of computer technology. The method includes: in a process of playing audio, partitioning left-channel audio data of the audio into audio data of a preset number of frequency sub-bands and partitioning right-channel audio data of the audio into audio data of the preset number of frequency sub-bands; calibrating the left-
(Continued)

channel audio data of respective frequency sub-bands with left-channel calibration parameter values of respective frequency sub-bands to obtain left-channel audio data to be played; calibrating the right-channel audio data of respective frequency sub-bands with right-channel calibration parameter values of respective frequency sub-bands to obtain right-channel audio data to be played; and playing, over a left channel, the left-channel audio data to be played, and playing, over a right channel, the right-channel audio data to be played.

20 Claims, 6 Drawing Sheets

(51) Int. Cl.
*G10L 19/02* (2013.01)
*G10L 19/032* (2013.01)
*H04R 3/04* (2006.01)
*H04S 7/00* (2006.01)

(52) U.S. Cl.
CPC ............... *H04R 3/04* (2013.01); *H04S 7/301* (2013.01); *H04S 2420/07* (2013.01)

(58) Field of Classification Search
CPC ............ H04S 2400/01; H04S 2400/11; H04S 2400/13; H04S 2400/15; H04R 3/04; G10L 19/02; G10L 19/032; G01S 3/8006; H03G 9/18; H03G 9/005; H03G 9/025; G06F 3/165
See application file for complete search history.

(56) References Cited

U.S. PATENT DOCUMENTS

| | | | |
|---|---|---|---|
| 2011/0085677 A1* | 4/2011 | Walsh | H03G 9/025 |
| | | | 381/94.3 |
| 2015/0062984 A1 | 3/2015 | Hu et al. | |
| 2016/0162254 A1 | 6/2016 | Benattar | |
| 2016/0183003 A1 | 6/2016 | Bender | |
| 2017/0223474 A1 | 8/2017 | Bender et al. | |

FOREIGN PATENT DOCUMENTS

| | | |
|---|---|---|
| CN | 104168435 A | 11/2014 |
| CN | 106100777 A | 11/2016 |
| CN | 106658301 Y | 5/2017 |
| CN | 108834037 A | 11/2018 |

OTHER PUBLICATIONS

Extended European search report of counterpart EP application No. 18919405.3 dated Oct. 15, 2020.

Matt Elliott: "Adjust your phone or tablet's audio balance for better listening", CNET, Apr. 5, 2016 (Apr. 5, 2016), XP055735877, p. 1-p. 2.

International search report of PCT application No. PCT/CN2018/117916 dated Mar. 7, 2019.

First office action of Chinese application No. 201810603069.1 dated May 21, 2019.

* cited by examiner

METHOD AND TERMINAL FOR PLAYING AUDIO DATA, AND STORAGE MEDIUM THEREOF

CROSS-REFERENCE TO RELATED APPLICATION

This application is a National Stage of International Application No. PCT/CN2018/117916, filed on Nov. 28, 2018, which claims priority to Chinese Patent Application No. 201810603069.1, filed on Jun. 12, 2018 and entitled "METHOD AND APPARATUS FOR PLAYING AUDIO DATA", the entire contents of which are incorporated herein by reference.

TECHNICAL FIELD

The present disclosure relates to the field of computer technologies, and in particular, relates to a method and a terminal for playing audio data, and a storage medium thereof.

BACKGROUND

With the development of computer technologies, stereo audio is becoming more and more popular. When the stereo audio is played, a left channel and a right channel are used for playing. Balance generally needs to be kept between the left channel and the right channel when audio data is played over the left channel and the right channel.

SUMMARY

Embodiments of the present disclosure provide a method and a terminal for playing audio data, and a storage medium thereof. The technical solutions are as follows.

In an aspect, a method for playing audio data is provided. The method includes:

acquiring left-channel audio data and right-channel audio data of target audio in a process of playing the target audio;

determining, according to a sampling frequency of the target audio, a preset number of frequency sub-bands corresponding to the sampling frequency;

performing polyphase filtering on the left-channel audio data to partition the left-channel audio data into the preset number of frequency sub-bands, and performing polyphase filtering on the right-channel audio data to partition the right-channel audio data into the preset number of frequency sub-bands;

synthesizing, according to left-channel calibration parameter values corresponding to the preset number of frequency sub-bands respectively, the left-channel audio data partitioned into the preset number of frequency sub-bands, to obtain left-channel audio data to be played, and synthesizing, according to right-channel calibration parameter values corresponding to the preset number of frequency sub-bands respectively, the right-channel audio data partitioned into the preset number of frequency sub-bands, to obtain right-channel audio data to be played; and playing, over a left channel, the left-channel audio data to be played, and playing, over a right channel, the right-channel audio data to be played.

In another aspect, an apparatus for playing audio data is provided. The apparatus includes:

an acquiring module, configured to acquire left-channel audio data and right-channel audio data of target audio in the process of playing the target audio;

a determining module, configured to determine, according to a sampling frequency of the target audio, a preset number of frequency sub-bands corresponding to the sampling frequency;

a filtering module, configured to perform polyphase filtering on the left-channel audio data to partition the left-channel audio data into the preset number of frequency sub-bands, and perform polyphase filtering on the right-channel audio data to partition the right-channel audio data into the preset number of frequency sub-bands;

a synthesizing module, configured to synthesize, according to left-channel calibration parameter values corresponding to the preset number of frequency sub-bands respectively, the left-channel audio data partitioned into the preset number of frequency sub-bands, to obtain left-channel audio data to be played, and synthesize, according to right-channel calibration parameter values corresponding to the preset number of frequency sub-bands respectively, the right-channel audio data partitioned into the preset number of frequency sub-bands, to obtain right-channel audio data to be played; and a playing module, configured to play, over a left channel, the left-channel audio data to be played, and play, over a right channel, the right-channel audio data to be played.

In yet another aspect, a terminal is provided. The terminal includes:

a processor and a memory;

wherein the memory is configured to store at least one instruction;

the at least one instruction is configured to be executed by the processor to perform one of the following operations:

acquiring left-channel audio data and right-channel audio data of target audio in a process of playing the target audio;

determining, according to a sampling frequency of the target audio, a preset number of frequency sub-bands corresponding to the sampling frequency;

performing polyphase filtering on the left-channel audio data to partition the left-channel audio data into the preset number of frequency sub-bands, and performing polyphase filtering on the right-channel audio data to partition the right-channel audio data into the preset number of frequency sub-bands;

synthesizing, according to left-channel calibration parameter values corresponding to the preset number of frequency sub-bands respectively, the left-channel audio data partitioned into the preset number of frequency sub-bands, to obtain left-channel audio data to be played, and synthesizing, according to right-channel calibration parameter values corresponding to the preset number of frequency sub-bands respectively, the right-channel audio data partitioned into the preset number of frequency sub-bands, to obtain right-channel audio data to be played; and playing, over a left channel, the left-channel audio data to be played, and playing, over a right channel, the right-channel audio data to be played.

In still yet another aspect, a computer-readable storage medium is provided. At least one instruction is stored in the storage medium and the at least one instruction is loaded and executed by a processor to perform the following operations:

acquiring left-channel audio data and right-channel audio data of target audio in a process of playing the target audio;

determining, according to a sampling frequency of the target audio, a preset number of frequency sub-bands corresponding to the sampling frequency;

performing polyphase filtering on the left-channel audio data to partition the left-channel audio data into the preset number of frequency sub-bands, and performing polyphase filtering on the right-channel audio data to partition the right-channel audio data into the preset number of frequency sub-bands;

synthesizing, according to left-channel calibration parameter values corresponding to the preset number of frequency sub-bands respectively, the left-channel audio data partitioned into the preset number of frequency sub-bands, to obtain left-channel audio data to be played, and synthesizing, according to right-channel calibration parameter values corresponding to the preset number of frequency sub-bands respectively, the right-channel audio data partitioned into the preset number of frequency sub-bands, to obtain right-channel audio data to be played; and playing, over a left channel, the left-channel audio data to be played, and playing, over a right channel, the right-channel audio data to be played.

DETAILED DESCRIPTION

For clearer descriptions of the objectives, technical solutions, and advantages of the present disclosure, the embodiments of the present disclosure are described in further detail below with reference to the accompanying drawings.

An embodiment of the present disclosure provides a method for playing audio data. An execution subject of this method may be a terminal. The terminal may be a mobile phone, a tablet computer, a computer or the like and may be provided with an audio application therein for playing audio data. Audio data of the terminal is played over at least two channels (such as a left channel and a right channel). For example, the terminal has two external loudspeakers, and a headphone of the terminal has two earpieces (for the left ear and the right ear respectively). A processor, a memory, a transceiver, a player and the like may be arranged in the terminal. The processor may be a central processing unit of the terminal, and may be configured to perform an audio data playing process. The memory may be configured to store data required for and data generated in the audio data playing process. The transceiver may be configured to receive and send data. The player may be configured to play audio data. The processor may be connected to the memory, the transceiver and player. A screen and other input and output devices may also be arranged in the terminal. The screen may be configured to display an audio-playing control interface and may be a touch screen or the like.

In the embodiment of the present disclosure, the solution is described in detail by taking a mobile phone as the terminal. Other situations are similar to this and thus are not repeatedly described in the embodiment of the present disclosure.

An application scenario of the embodiment of the present disclosure is briefly introduced firstly before the embodiment is described.

Currently, when a user uses a playback device with two channels (two loudspeakers or a headphone having a left channel and a right channel) to listen to stereo audio, left-channel audio data and right-channel audio data are different. Some users have different sensitivities to sounds having different frequencies. For example, the left ear is sensitive to guitar sounds, but not sensitive to piano sounds. In order to make the left ear hear the piano sounds, the volume of the left channel is increased only. As such, although the user may hear the piano sounds, the volume of other sounds that are heard originally is also increased, and thus the user experience is relatively poor. Hence, based on this, the solution of the embodiment of the present disclosure is proposed.

Figure 1:
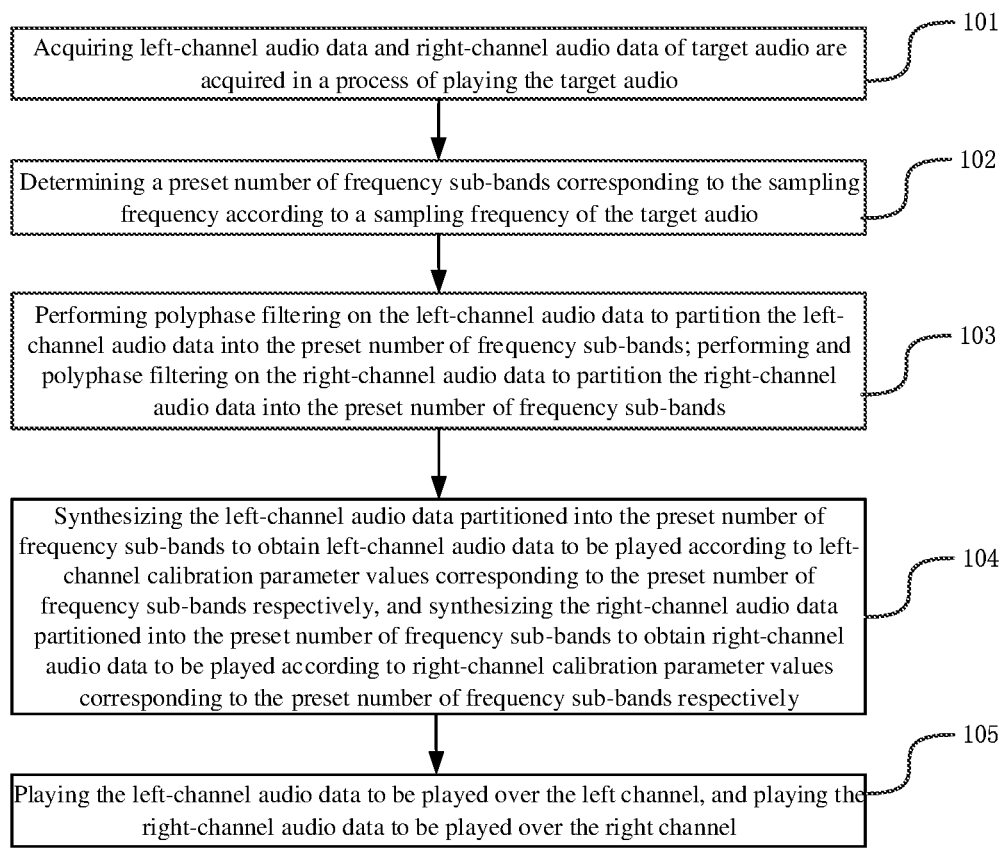
FIG. 1 is a schematic flowchart of a method for playing audio data according to an embodiment of the present disclosure.

As shown in FIG. 1, a processing flowchart of the method for playing audio data may be as follows.

In step 101, left-channel audio data and right-channel audio data of target audio are acquired in a process of playing the target audio.

The target audio is any audio data in stereo audio, such as the song Ice Rain and the like.

In practice, an audio application is mounted in the terminal. When playing certain stereo audio (which may be called the target audio later) with the audio application, the user may open the audio application, and the terminal may display a song list. The user may select the target audio in the song list and then click on a corresponding playing option. The terminal detects a clicking instruction of the playing option, and caches the audio data in the target audio to the player of the terminal (either from the terminal locally to the player or from a background server of the audio application to the player). It should be noted here that since there are two channels, there are two channels of audio data at the same time during caching, one is the left-channel audio data and the other is the right-channel audio data.

Whenever detecting the left-channel audio data and the right-channel audio data in the target audio, which are cached to the player, the terminal may acquire the cached left-channel audio data and the cached right-channel audio data.

Optionally, a certain amount of left-channel audio data and a certain amount of right-channel audio data may be acquired every time, and the corresponding processing may be as follows.

Left-channel audio data and right-channel audio data in the target audio are cached; and the currently-cached left-channel audio data and the currently-cached right-channel audio data are acquired when the data amount of each of the cached left-channel audio data and the cached right-channel audio data in the target audio reaches a first preset value.

The first preset value may be preset, and stored to the terminal, and is, for example, 1024 audio frames or the like.

In practice, whenever detecting that the data amount of each of the left-channel audio data and the right-channel audio data in the target audio, which are cached to the player, reaches the first preset value, the terminal may acquire the currently-cached left-channel audio data and the currently-cached right-channel audio data for subsequent processing. For example, if the first preset value is 1024 audio frames, the terminal may acquire the currently-cached 2048 audio frames for subsequent processing when detecting that the data amount of each of the left-channel audio data and the right-channel audio data in the target audio, which are cached to the player, reaches 1024 audio frames.

In step 102, according to a sampling frequency of the target audio, a preset number of frequency sub-bands corresponding to the sampling frequency are determined.

The sampling frequency refers to the number of samples which are extracted per second from a continuous signal and constitute a discrete signal. For example, the sampling frequency is 44.1 KHz. The frequency bandwidths of the preset number of frequency sub-bands are substantially the same. That is, for all frequency sub-bands, differences between the maximum frequencies and the minimum frequencies are substantially the same, and for example, the difference is 689 Hz or the like. The preset number may be an even number.

In practice, the terminal may acquire the sampling frequency of the target audio from attribute information of the target audio. The sampling frequency of the target audio corresponds to a frequency range of audio data in the target audio, and the maximum value of the frequency range of the audio data may be half of the sampling frequency. For example, if the sampling frequency is 44.1 KHz, the frequency range of the data in the target audio is "0-22.05 KHz"; and if the sampling frequency is 88.2 KHz, the frequency range of the data in the target audio is "0-44.10 KHz".

A corresponding relationship between the sampling frequency and the frequency sub-band is stored in the terminal. The terminal may determine the preset number of frequency sub-bands corresponding to the sampling frequency from this corresponding relationship by using the sampling frequency of the target audio. For example, if the sampling frequency is 44.1 KHz, the corresponding number of frequency sub-bands is 32, and the frequency ranges of 32 frequency sub-bands are also included.

In addition, the terminal may also store a standard sampling frequency and the corresponding number of the frequency sub-bands, that is, the standard sampling frequency is 44.1 KHz, and the corresponding number of the frequency sub-bands is 32. Subsequently, the frequency sub-bands corresponding to the sampling frequency of the target audio may be determined by using the standard sampling frequency. For example, if the sampling frequency of the target audio is 22.05 KHz, the corresponding number of the frequency sub-bands is 16 (since the sampling frequency is half of the standard sampling frequency, the number of the frequency sub-bands is also half of the standard number of the frequency sub-bands). If the sampling frequency of the target audio is 88.2 KHz, the corresponding number of the frequency sub-bands is 64 (since the sampling frequency is 2 times of the standard sampling frequency, the number of the frequency sub-bands is also 2 times of the standard number of the frequency sub-bands).

In step 103, polyphase filtering is performed on the left-channel audio data to partition the left-channel audio data into the preset number of frequency sub-bands; and polyphase filtering is performed on the right-channel audio data to partition the right-channel audio data into the preset number of frequency sub-bands.

In implementation, after obtaining the left-channel audio data and the right-channel audio data, the terminal may perform polyphase filtering on the left-channel audio data with a cascaded quadrature mirror filter (QMF) to partition the left-channel audio data into the preset number of frequency sub-bands, wherein the frequency sub-bands correspond to different frequency ranges respectively; and the terminal may perform polyphase filtering on the right-channel audio data with the cascaded QMF to partition the right-channel audio data into the preset number of frequency sub-bands.

Figure 2:
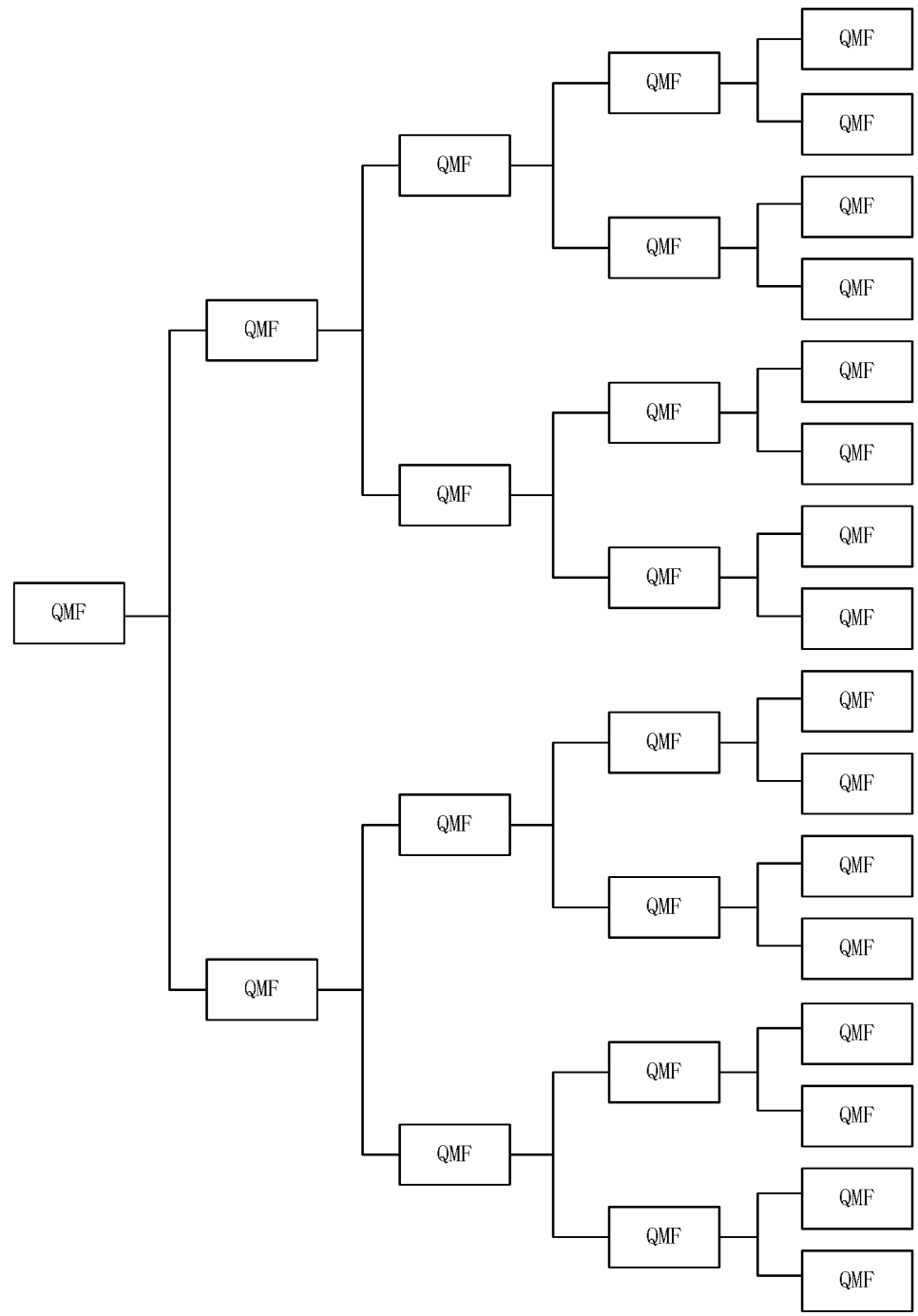
FIG. 2 is a schematic diagram of a cascade QMF according to an embodiment of the present disclosure.

In the above processing, for the left-channel audio data or the right-channel audio data, the cascaded QMF includes a plurality of QMFs. Each QMF may partition the input audio data into two sets of audio data having different frequency ranges, and all frequencies of one set of audio data are higher than the frequencies of the other set of audio data. For example, if the frequency range of the audio data input into the QMF is 20 Hz-22050 Hz, the frequency ranges of two sets of obtained audio data are 20 Hz-11035 Hz and 11035 Hz-22050 Hz respectively. As such, the cascaded QMF includes (the preset number−1) QMFs. For example, as shown in FIG. 2, if the preset number is 32, 31 QMFs are required.

It should be noted that when the preset number of frequency sub-bands are obtained, if the sampling frequency is 44.1 KHz, the target audio data with the frequency range of 20 Hz-22050 Hz may be input into the first QMF and thus two sets of audio data with the frequency ranges of 20 Hz-11035 Hz and 11035 Hz-22050 Hz respectively of the frequency sub-bands are obtained. Subsequently, the two sets of audio data with the frequency ranges of 20 Hz-11035 Hz and 11035 Hz-22050 Hz respectively are equally partitioned, such that audio data of the preset number of frequency sub-bands is obtained.

Optionally, in order to reduce the frequency spectrum energy leakage of the audio, the acquired left-channel audio data and the acquired right-channel audio data may be windowed, and the corresponding processing of step 103 may be as follows.

Based on a preset window function, the left-channel audio data is windowed to obtain windowed left-channel audio data and the right-channel audio data is windowed to obtain windowed right-channel audio data; and polyphase filtering is performed on the windowed left-channel audio data to partition the windowed left-channel audio data into the preset number of frequency sub-bands; and polyphase filtering is performed on the windowed right-channel audio data to partition the windowed right-channel audio data into the preset number of frequency sub-bands.

The preset window function may be pre-stored in the terminal. In order to reduce the frequency spectrum energy leakage, different interception functions may be used to cut off a signal. The interception function is called a window function, such as the Hamming window function, the Hann window function or the like. The Hamming window function is also a type of cosine window function and also called an improved raised cosine window function. The embodiment of the present disclosure is illustrated by taking the window function as the Hamming window function. The window length of the preset window function may be equal to the first preset value in step 101.

In practice, after obtaining the cached left-channel audio data and the cached right-channel audio data, the terminal may acquire the preset window function and then window the cached left-channel audio data to obtain the windowed left-channel audio data. In addition, the terminal may window the cached right-channel audio data with the preset window function to obtain the windowed right-channel audio data.

For example, if the currently-cached left-channel audio data acquired in step 101 is X1 and the window function is W, the windowed left-channel audio data is X1*W. If the currently-cached right-channel audio data acquired in step 102 is X2 and the window function is W, the windowed right-channel audio data is X2*W.

Subsequently, the terminal may perform polyphase filtering on the left-channel audio data with the cascaded QMF to partition the windowed left-channel audio data into the preset number of frequency sub-bands; and may perform polyphase filtering on the right-channel audio data with the cascaded QMF to partition the windowed right-channel audio data into the preset number of frequency sub-bands.

In step 104, according to left-channel calibration parameter values corresponding to the preset number of frequency sub-bands respectively, the left-channel audio data partitioned into the preset number of frequency sub-bands is synthesized to obtain left-channel audio data to be played, and according to right-channel calibration parameter values corresponding to the preset number of frequency sub-bands respectively, the right-channel audio data partitioned into the preset number of frequency sub-bands is synthesized to obtain right-channel audio data to be played.

The terminal pre-stores the left-channel calibration parameter value and the right-channel calibration parameter value which correspond to each frequency sub-band.

In practice, the terminal may acquire the pre-stored left-channel calibration parameter value and the pre-stored right-channel calibration parameter value which correspond to each frequency sub-band. Next, the terminal may synthesize, according to left-channel calibration parameter values corresponding to the frequency sub-bands respectively, the left-channel audio data partitioned into the preset number of frequency sub-bands to obtain left-channel audio data to be played, and may synthesize, according to right-channel calibration parameter values corresponding to the frequency sub-bands respectively, the right-channel audio data partitioned into the preset number of frequency sub-bands to obtain right-channel audio data to be played.

Optionally, the left-channel audio data to be played and the right-channel audio data to be played may be determined based on a multiplication mode, and the corresponding processing of step 104 may be as follows.

For each frequency sub-band in the preset number of frequency sub-bands, the left-channel calibration parameter value corresponding to the frequency sub-band is multiplied by the left-channel audio data partitioned into the frequency sub-band to obtain calibrated left-channel audio data at the frequency sub-band, and the right-channel calibration parameter value corresponding to the frequency sub-band is multiplied by the right-channel audio data partitioned into the frequency sub-band to obtain calibrated right-channel audio data at the frequency sub-band; and the calibrated left-channel audio data at the preset number of frequency sub-bands is synthesized to obtain left-channel audio data to be played, and the calibrated right-channel audio data at the preset number of frequency sub-bands is synthesized to obtain right-channel audio data to be played.

In practice, for any frequency sub-band in the preset number of frequency sub-bands, the terminal may acquire the left-channel calibration parameter value corresponding to the frequency sub-band and may acquire the right-channel calibration parameter value corresponding to the frequency sub-band; and then multiply the left-channel audio data partitioned into the frequency sub-band by the acquired left-channel calibration parameter value to obtain the calibrated left-channel audio data at the frequency sub-band, and multiply the right-channel audio data partitioned into the frequency sub-band by the acquired right-channel calibration parameter value to obtain calibrated right-channel audio data at the frequency sub-band.

Subsequently, the terminal performs synthesis (which may also be called audio mixing processing) on calibrated left-channel audio data at the preset number of frequency sub-bands to obtain left-channel audio data to be played, and performs synthesis on the calibrated right-channel audio data at the preset number of frequency sub-bands to obtain right-channel audio data to be played.

For example, the preset number is 32, and the left-channel audio data at the preset number of audio sub-bands is represented by SUBBAND1(n), where n represents any frequency sub-band and is greater than or equal to 1 and less than or equal to 32. At any frequency sub-band n, the calibrated left-channel audio data is SUBBAND1[n]=SUBBAND1(n)*COEFF(n)_L, where COEFF(n)_L represents the left-channel calibration parameter value corresponding to the frequency sub-band n (L is the abbreviation of LEFT and represents left), and SUBBAND1(n) represents the left-channel audio data at the frequency sub-band n. The calibrated left-channel audio data at the preset number of frequency sub-bands is synthesized as Y1=SUBBAND1[n]+SUBBAND1[n−1]+ . . . +SUBBAND1[1] and based on Y1, the left-channel audio data to be played LOUT is obtained.

Similarly, for the right channel, at any frequency sub-band n, the calibrated right-channel audio data is SUBBAND2[n]=SUBBAND2(n)*COEFF(n)_R, where COEFF(n)_R represents the right-channel calibration parameter value corresponding to the frequency sub-band n (R is the abbreviation of RIGHT and represents right), and SUBBAND2(n) represents the right-channel audio data at the frequency sub-band n. The calibrated right-channel audio data at the preset number of frequency sub-bands is synthesized as Y2=SUBBAND2[n]+SUBBAND2[n−1]+ . . . +SUBBAND2[1] and based on Y2, the right-channel audio data to be played LOUT is obtained.

Optionally, in corresponding step 103, the audio data is windowed. Here, the audio data should also be inversely windowed and the corresponding processing of step 104 may be as follows.

According to left-channel calibration parameter values corresponding to the preset number of frequency sub-bands respectively, the windowed left-channel audio data partitioned into the preset number of frequency sub-bands is synthesized to obtain synthesized left-channel audio data, and based on a preset inverse window function, the synthesized left-channel audio data is inversely windowed to obtain left-channel audio data to be played; and according to right-channel calibration parameter values corresponding to the preset number of frequency sub-bands respectively, the windowed right-channel audio data partitioned into the preset number of frequency sub-bands is synthesized to obtain synthesized right-channel audio data, and based on the preset inverse window function, the synthesized right-channel audio data is inversely windowed to obtain right-channel audio data to be played.

The inverse window function may be preset and stored in the terminal and corresponds to the foregoing window function. If the window function is the Hamming window function, the inverse window function is the inverse Hamming window function. The window function is formulated as W and the inverse window function is formulated as IW.

In practice, for any frequency sub-band in the preset number of frequency sub-bands, the terminal may acquire the left-channel calibration parameter value corresponding to the frequency sub-band and may acquire the right-channel calibration parameter value corresponding to the frequency sub-band; and then multiply the windowed left-channel audio data partitioned into the frequency sub-band by the acquired left-channel calibration parameter value to obtain the calibrated left-channel audio data at the frequency sub-band, and multiply the windowed right-channel audio data partitioned into the frequency sub-band by the acquired right-channel calibration parameter value to obtain calibrated right-channel audio data at the frequency sub-band.

Subsequently, the terminal performs synthesis (which may also be called audio mixing processing) on calibrated left-channel audio data at the preset number of frequency sub-bands to obtain synthesized left-channel audio data, and inversely window the synthesized left-channel audio data based on the preset inverse window function to obtain the left-channel audio data to be played; and performs synthesis (which may also be called audio mixing processing) on calibrated right-channel audio data at the preset number of frequency sub-bands to obtain synthesized right-channel audio data, and inversely window the synthesized right-channel audio data based on the preset inverse window function to obtain the right-channel audio data to be played. For example, if the synthesized left-channel audio data is Y1 and the inverse window function may be IW, the left-channel audio data to be played is: LOUT=Y1*IW; and if the synthesized right-channel audio data is Y2 and the inverse window function may be IW, the right-channel audio data to be played is: LOUT=Y2*IW.

Optionally, in order to better adjust the balance between the left channel and the right channel, the synthesized left-channel audio data and the synthesized right-channel audio data may further be adjusted and the corresponding processing may be as follows.

According to left-channel calibration parameter values corresponding to the preset number of frequency sub-bands respectively, the left-channel audio data partitioned into the preset number of frequency sub-bands is synthesized to obtain synthesized left-channel audio data, and multiplying left-channel calibration parameter values corresponding to a third preset frequency range by the synthesized left-channel audio data to obtain the left-channel audio data to be played; and according to right-channel calibration parameter values corresponding to the preset number of frequency sub-bands respectively, the right-channel audio data partitioned into the preset number of frequency sub-bands is synthesized to obtain synthesized right-channel audio data, and multiplying right-channel calibration parameter values corresponding to the third preset frequency range by the synthesized right-channel audio data to obtain the right-channel audio data to be played.

The third preset frequency range may be preset and stored in the terminal, and may be obtained by merging a first preset frequency range and a second preset frequency range which are mentioned below. For example, the third preset frequency range is 20 Hz-22050 Hz.

In practice, for any frequency sub-band in the preset number of frequency sub-bands, the terminal may acquire the left-channel calibration parameter value corresponding to the frequency sub-band and the right-channel calibration parameter value corresponding to the frequency sub-band; and multiply the left-channel audio data partitioned into the frequency sub-band by the acquired left-channel calibration parameter value to obtain the calibrated left-channel audio data at the frequency sub-band, and multiply the right-channel audio data partitioned into the frequency sub-band by the acquired right-channel calibration parameter value to obtain calibrated right-channel audio data at the frequency sub-band.

Subsequently, the terminal performs synthesis (which may also be called audio mixing processing) on calibrated left-channel audio data at the preset number of frequency sub-bands to obtain synthesized left-channel audio data, and multiplies the synthesized left-channel audio data by the left-channel calibration parameter values corresponding to the third preset frequency range to obtain the left-channel audio data to be played; and performs synthesis (which may also be called audio mixing processing) on calibrated right-channel audio data at the preset number of frequency sub-bands to obtain synthesized right-channel audio data, and multiplies the synthesized right-channel audio data by the right-channel calibration parameter values corresponding to the third preset frequency range to obtain the right-channel audio data to be played.

As such, after the synthesized left-channel audio data and the synthesized right-channel audio data are obtained, the synthesized left-channel audio data is calibrated with the left-channel calibration parameter values corresponding to the third preset frequency range and the synthesized right-channel audio data is calibrated with the right-channel calibration parameter values corresponding to the third preset frequency range. Since the third preset frequency range corresponds to the frequency range of the synthesized left-channel audio data and the frequency range of the synthesized right-channel audio data, the balance between the left channel and the right channel may be adjusted better by using the left-channel calibration parameter values and the right-channel calibration parameter values which all correspond to the third preset frequency range for comprehensive calibration again.

It should be noted that the mode for determining the right-channel calibration parameter values and the left-channel calibration parameter values, which all correspond to the third preset frequency range, is the same as the mode for determining the right-channel calibration parameter values and the left-channel calibration parameter values, which all correspond to the first preset frequency range latter and will be described later.

In step 105, the left-channel audio data to be played is played over the left channel, and the right-channel audio data to be played is played over the right channel.

In practice, after obtaining the left-channel audio data to be played and the right-channel audio data to be played, the terminal may play, over the left channel of the player, the left-channel audio data to be played and at the same play, over the right channel of the player, the right-channel audio data to be played. As such, since both the left-channel audio data to be played and the right-channel audio data to be played are adjusted with the calibration parameter values, the balance between the left channel and the right channel may be kept better and thus the user may hear the stereo audio with the best effect.

In addition, in the embodiment of the present disclosure, the method for determining the left-channel calibration parameter value and the right-channel calibration parameter value is also given and the corresponding processing may be as follows.

First preset audio data in a first preset frequency range is played over the left channel and the right channel simultaneously, and an adjustment slider of an adjustment parameter is displayed, wherein the first preset audio data is single-channel audio data. When a determining instruction corresponding to the adjustment slider is detected, a left-channel adjustment parameter value and a right-channel adjustment parameter value which correspond to the first preset frequency range are determined according to a position of an adjustment pointer on the adjustment slider. For a first frequency sub-band whose frequency range is the first preset frequency range in the preset number of frequency sub-bands, a left-channel calibration parameter value and a right-channel calibration parameter value which correspond to the first frequency sub-band are determined according to a left-channel adjustment coefficient and a right-channel adjustment coefficient which correspond to the first frequency sub-band, and the left-channel adjustment parameter value and the right-channel adjustment parameter value which correspond to the first preset frequency range.

The first preset frequency range may be a fundamental-tone frequency range, such as 20 Hz-689 Hz. The first preset audio data may be preset, and is any audio data and single-channel audio data.

Figure 3:
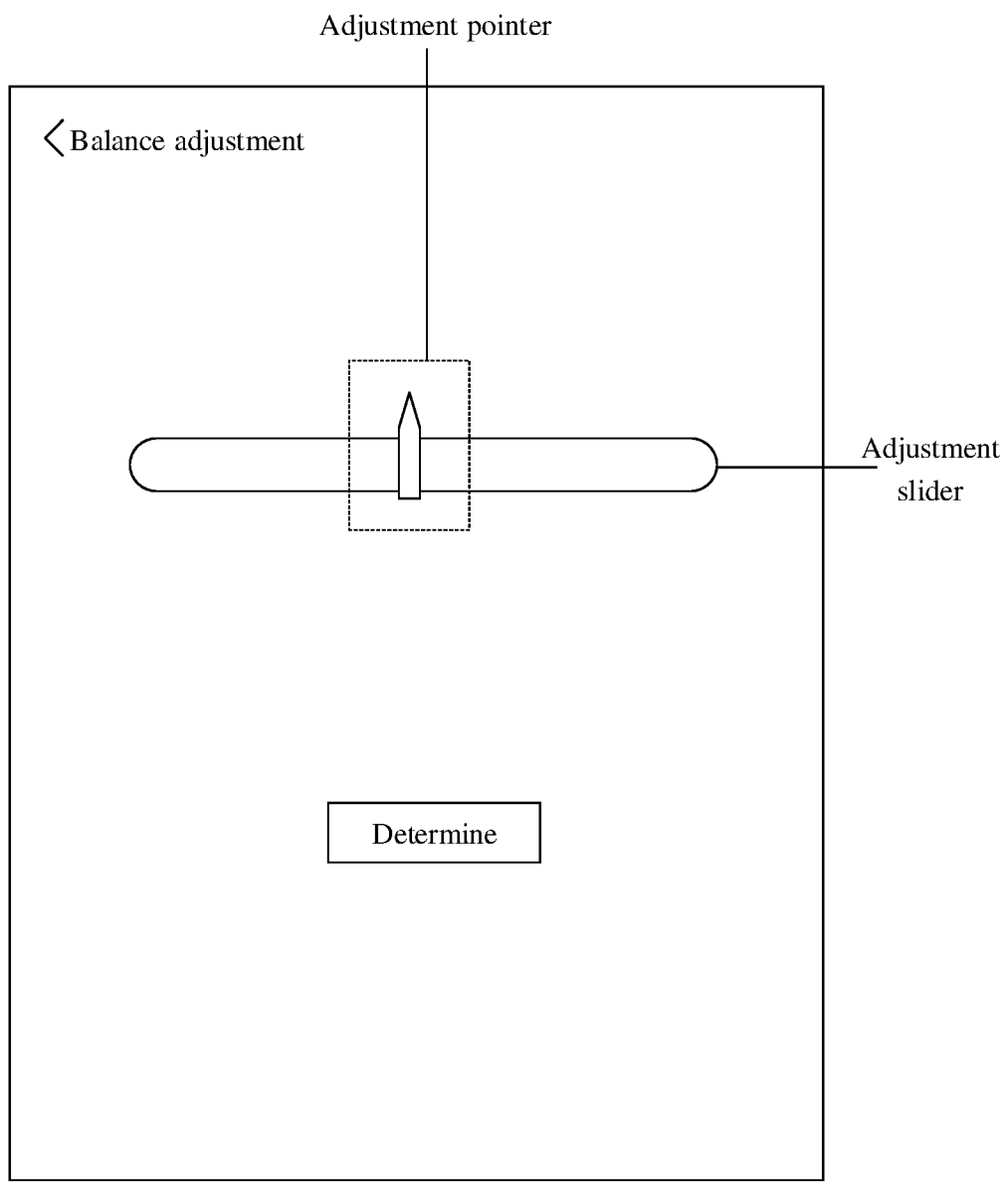
FIG. 3 is a schematic diagram for a balance adjustment interface according to an embodiment of the present disclosure.

In practice, when opening the audio application for listening to the target audio, the user may open set options having a balance adjustment option, and click on the balance adjustment option, and the terminal will detect a clicking instruction of the balance adjustment option. The terminal may display a balance adjustment interface and plays first preset audio data in the first preset frequency range. As shown in FIG. 3, a slider and a determination button are displayed in the balance adjustment interface. The user may determine whether the left channel and the right channel are balanced by listening to the first preset audio data. If feeling unbalanced, the user may drag the adjustment pointer on the slider until the user feels that the sounds of the left channel and the right channel are balanced. The user may click on the determination button displayed in the interface. The terminal will detect the clicking instruction of the determination button, that is, detect the determination button corresponding to the adjustment slider, and determine the position of the adjustment pointer on the adjustment slider. The terminal determines, according to the determined position, the left-channel adjustment parameter value and the right-channel adjustment parameter value which correspond to the first preset frequency range;

Afterwards, the terminal acquires the pre-stored left-channel adjustment coefficient and the pre-stored right-channel adjustment coefficient which correspond to the first preset frequency range; multiplies the left-channel adjustment coefficient by the left-channel adjustment parameter value to obtain the left-channel calibration parameter value corresponding to the first preset frequency range, and multiplies the right-channel adjustment coefficient by the right-channel adjustment parameter value to obtain the right-channel calibration parameter value corresponding to the first preset frequency range.

The terminal determines the left-channel calibration parameter value corresponding to the first preset frequency range as the left-channel calibration parameter value corresponding to the first frequency sub-band, and determines the right-channel calibration parameter value corresponding to the first preset frequency range as the right-channel calibration parameter value corresponding to the first frequency sub-band; and stores the left-channel calibration parameter value and the right-channel calibration parameter value. These two calibration parameter values may be used subsequently.

Or before playing the audio, the user may perform setting in the set options of the terminal, and the corresponding processing may be as follows.

A sound option is set in the set options of the terminal. The user may trigger the display of an interface corresponding to the sound option, and a balance option of the audio is displayed in the interface. The user may control the terminal to display a balance adjustment interface by triggering this option. When the terminal detects a triggering instruction of this option, the first preset audio data in the first preset frequency range may be played while the balance adjustment interface is displayed. The subsequent mode is consistent with the mode for setting in the audio application, and is not described repeatedly here.

Optionally, in the embodiment of the present disclosure, the solution for determining left-channel parameter values and right-channel parameter values of other frequency sub-bands, except the first frequency sub-band, in the preset number of frequency sub-bands is also provided and the corresponding processing may be as follows.

Second preset audio data in a second preset frequency range is played over the left channel and the right channel simultaneously, and an adjustment slider of an adjustment parameter is displayed, wherein the second preset audio data is single-channel audio data; when a determining instruction corresponding to the adjustment slider is detected, a left-channel adjustment parameter value and a right-channel adjustment parameter value which correspond to the second preset frequency range are determined according to a position of an adjustment pointer on the adjustment slider; and for a second frequency sub-band in other frequency sub-bands, except the first frequency sub-band, in the preset number of frequency sub-bands, a left-channel calibration parameter value and a right-channel calibration parameter value which correspond to the second frequency sub-band are determined according to a left-channel adjustment coefficient and a right-channel adjustment coefficient which correspond to the second frequency sub-band, and the left-channel adjustment parameter value and the right-channel adjustment parameter value which correspond to the second preset frequency range.

The second preset frequency range may be an overtone frequency range, such as 690 Hz-22050 Hz. The second preset audio data may be preset, and is any audio data and single-channel audio data.

In practice, after detecting the determining instruction corresponding to the adjustment slider, the terminal may play the second preset audio data in the second preset frequency range. The user may determine whether the left channel and the right channel are balanced by listening to the second preset audio data. If feeling unbalanced, the user may drag an adjustment pointer on the slider until the user feels that the sounds of the left channel and the right channel are balanced. The user may click on the determination button displayed in the interface. The terminal may detect the clicking instruction of the determination button, that is, detect the determination button corresponding to the adjustment slider, and determine the position of the adjustment pointer on the adjustment slider. The terminal determines, according to the determined position, a left-channel adjustment parameter value and a right-channel adjustment parameter value which correspond to the second preset frequency range.

For the second frequency sub-band in other frequency sub-bands, except the first frequency sub-band, in the preset number of frequency sub-bands, the terminal may acquire a pre-stored left-channel adjustment coefficient and a pre-stored right-channel adjustment coefficient which correspond to the second frequency sub-band; and then determine a left-channel calibration parameter value and a right-channel calibration parameter value which correspond to the second frequency sub-band, according to the left-channel adjustment coefficient and the right-channel adjustment coefficient which correspond to the second frequency sub-band, and the left-channel adjustment parameter value and the right-channel adjustment parameter value which correspond to the second preset frequency range. As such, the left-channel calibration parameter values and the right-channel calibration parameter values of the preset number of frequency sub-bands may be determined. The left-channel calibration parameter value and the right-channel calibration parameter value are stored and these two parameter values may be used subsequently.

Alternatively, before playing the audio, the user may perform setting in the set options of the terminal, and the corresponding processing may be as follows.

A sound option is set in the set options of the terminal. The user may trigger the display of an interface corresponding to the sound option, and a balance option of the audio is displayed in the interface. The user may control the terminal to display a balance adjustment interface by triggering this option. When the terminal detects a triggering instruction of this option, the second preset audio data in the second preset frequency range may be played while the balance adjustment interface is displayed. The subsequent mode is consistent with the mode for setting in the audio application, and is not described repeatedly here.

It should be noted that the range of the above adjustment slider may be [−100, +100]. The minimum movement length of the adjustment pointer is at least 1, that is, the adjustment pointer at least moves from −100 to −99, other than −9.55. Each value from −100 to +100 may be split into a left-channel adjustment parameter value and a right-channel adjustment parameter value. For example, −100 may be split into [100, 0], 100 represents the left-channel adjustment parameter value and 0 represents the right-channel adjustment parameter value. −50 may be split into [100, 50], 100 represents the left-channel adjustment parameter value and 50 represents the right-channel adjustment parameter value. As such, the left-channel adjustment parameter value and the right-channel adjustment parameter value may be determined as long as the current position of the adjustment pointer is known.

It should also be noted that the first frequency range corresponds to the fundamental-tone frequency range and the second frequency range corresponds to the overtone frequency range. Most users have different perception abilities to the fundamental tone and the overtone, such that the left-channel calibration parameter value and the right-channel calibration parameter value which correspond to the fundamental tone, and the left-channel calibration parameter value and the right-channel calibration parameter value which correspond to the overtone need to be determined respectively, that is, the left-channel calibration parameter value and the right-channel calibration parameter value which correspond to the first frequency sub-band, and the left-channel calibration parameter value and the right-channel calibration parameter value which correspond to the other frequency sub-band except the first frequency sub-band are determined respectively. As such, the determined left-channel calibration parameter value and right-channel calibration parameter value are more accurate.

Optionally, the following mode may be used to determine the left-channel calibration parameter value and the right-channel calibration parameter value which correspond to the second frequency sub-band, and the corresponding processing may be as follows.

The left-channel adjustment coefficient corresponding to the second frequency sub-band is multiplied by the left-channel adjustment parameter value corresponding to the second preset frequency range to obtain the left-channel calibration parameter value corresponding to the second frequency sub-band, and the right-channel adjustment coefficient corresponding to the second frequency sub-band is multiplied by the right-channel adjustment parameter value corresponding to the second preset frequency range to obtain the right-channel calibration parameter value corresponding to the second frequency sub-band.

In practice, the terminal multiplies the left-channel adjustment coefficient of the second frequency sub-band by the left-channel adjustment parameter value corresponding to the second preset frequency range to obtain the left-channel calibration parameter value corresponding to the second frequency sub-band, and multiplies the right-channel adjustment coefficient of the second frequency sub-band by the right-channel adjustment parameter value corresponding to the second preset frequency range to obtain the right-channel calibration parameter value corresponding to the second frequency sub-band.

Optionally, when a right-channel calibration parameter value and a left-channel calibration parameter value which correspond to the third preset frequency range are determined, third preset audio data in the third preset frequency range is used only. The user performs adjustment based on the third preset audio data heard, and uses a left-channel adjustment coefficient and a right-channel adjustment coefficient which correspond to the third preset frequency range, during calculation later, and the remaining process is the same as the process for determining the left-channel calibration parameter value and the right-channel calibration parameter value which correspond to the first preset frequency range, and is not described repeatedly here.

In addition, in the embodiment of the present disclosure, left-channel adjustment coefficients and right-channel adjustment coefficients of respective frequency sub-bands are also given when the sampling frequency of the audio is 44.1 KHz and the preset number is 32, as shown in Table 1.

TABLE 1

| N | Left-channel adjustment coefficient | Right-channel adjustment coefficient |
| --- | --- | --- |
| 1 | 1.0 | 1.0 |
| 2 | 1.0 | 1.0 |
| 3 | 1.0 | 1.0 |
| 4 | 0.989 | 1.011 |
| 5 | 0.978 | 1.022 |
| 6 | 0.967 | 1.033 |
| 7 | 0.846 | 1.154 |
| 8 | 1.154 | 0.846 |
| 9 | 1.033 | 0.967 |
| 10 | 1.022 | 0.978 |
| 11 | 1.011 | 0.989 |
| 12 | 0.877 | 1.123 |
| 13 | 0.877 | 1.123 |
| 14 | 0.877 | 1.123 |
| 15 | 0.877 | 1.123 |
| 16 | 1.123 | 0.877 |
| 17 | 1.123 | 0.877 |
| 18 | 1.123 | 0.877 |
| 19 | 1.123 | 0.877 |
| 20 | 0.941 | 1.059 |
| 21 | 0.904 | 1.096 |
| 22 | 0.867 | 1.133 |
| 23 | 0.83 | 1.17 |
| 24 | 1.17 | 0.83 |
| 25 | 1.133 | 0.867 |
| 26 | 1.096 | 0.904 |
| 27 | 1.059 | 0.941 |
| 28 | 1.0 | 1.0 |
| 29 | 0.9999 | 0.9999 |
| 30 | 0.999 | 0.999 |
| 31 | 0.99 | 0.99 |
| 32 | 0.9 | 0.9 |

In Table 1, N denotes the number of the frequency sub-band, each frequency sub-band corresponds to one frequency range and there is no crossover frequency range. The difference between endpoint values of the frequency range corresponding to each frequency sub-band is approximately equal to 689 Hz (the second preset value is 689 Hz). The frequency range of 0-22050 Hz may be obtained by merging the frequency ranges of the frequency sub-bands from N=1 to N=32. The larger the N is, the larger the endpoint values of the frequency range corresponding to the frequency sub-band are. For example, when N=1, the frequency range of the frequency sub-band is 0-689 Hz; when N=2, the frequency range of the frequency sub-band is 690 Hz-1379 Hz; and when N=32, the frequency range of the frequency sub-band is 21361 Hz-22050 Hz. When the sampling frequency is 88.2 KHz, the frequency range is 0-44100 Hz. Since the sound range that may be heard by people is generally 0-22050 Hz, the left-channel calibration parameter values and the right-channel calibration parameter values of the above 32 frequency sub-bands may be used to adjust audio data with the frequency range of 0-22050 Hz only; and since the audio data with the frequency range of 22061 Hz-44100 Hz cannot be heard by the user, it does not matter if it is not adjusted. When the sampling frequency is 22.05 KHz, the frequency range is 0-11025 Hz. Hence the left-channel calibration parameter values and the right-channel calibration parameter values of the first 16 frequency sub-bands in 32 frequency sub-bands may be used only to adjust audio data with the frequency range of 0-11025 Hz.

In the embodiment of the present disclosure, the mode of playing the currently-cached left-channel audio data and the currently-cached right-channel audio data is only described, and the above processing is performed when the left-channel audio data and the right-channel audio data each are cached to the data amount equal to the first preset value each time. As such, it may be determined that the balance between the left channel and the right channel is adjusted for all the left-channel audio data and right-channel audio data in the target audio, and thus the user may hear the stereo audio with the best effect.

It should be noted that in the above process, the user determines, by listening to the audio in advance, the left-channel calibration parameter value and the right-channel calibration parameter value of each frequency sub-band, which satisfy user's requirements, and subsequently, directly uses these two calibration parameter values for adjustment, such that the user may hear the audio data that the user feels that the left channel and the right channel is balanced.

It should be noted that through the above embodiment, for the left channel or the right channel, the audio data of the different frequency sub-bands is adjusted based on the calibration parameter values corresponding to different frequency sub-bands, such that the user may hear sounds to which, the user are not sensitive. For example, for the user, the left ear is sensitive to guitar sounds, but not sensitive to piano sounds. Through the left-channel calibration parameter value of the frequency sub-band corresponding to the piano sounds, the volume of the piano sounds may become a little higher without changing other sounds at other frequencies of the left channel.

In the related art, generally, volumes of the left channel and the right channel of a playing device are adjusted to maintain the balance between the left channel and the right channel.

Since the human auditory system samples sounds with different frequencies by different sampling methods, a best auditory effect may not be achieved by simply adjusting the volumes of the left channel and the right channel. Therefore, it is urgent to provide a method for adjusting the balance between the left channel and the right channel.

In the embodiment of the present disclosure, the audio is partitioned into a plurality of frequency sub-bands, and based on the left-channel calibration parameter values and the right-channel calibration parameter values of the different frequency sub-bands, the left-channel audio data at the respective frequency sub-bands and the right-channel audio data at the respective frequency sub-bands are respectively calibrated; and compared with the method which only adjusts the volume in the related art, the method for adjusting the balance between the left channel and the right channel is provided, which may better adjust the balance between the left channel and the right channel, and thus achieve a better audio data playing effect.

Figure 4:
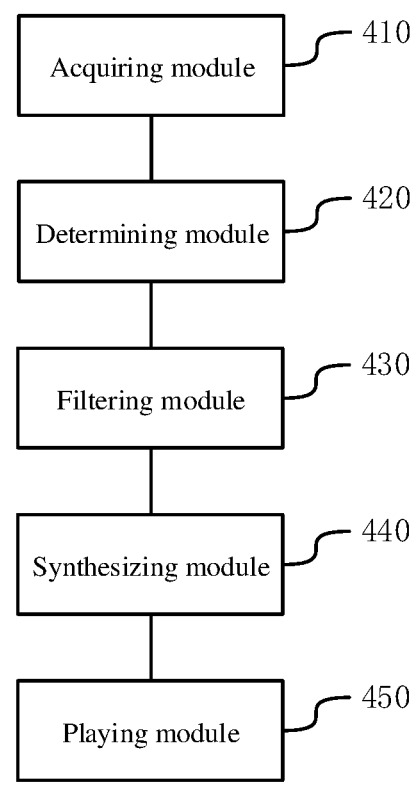
FIG. 4 is a schematic structural diagram of an apparatus for playing audio data according to an embodiment of the present disclosure.

Based on the same technical concept, the embodiment of the present disclosure further provides an apparatus for playing audio data. As shown in FIG. 4, the apparatus includes:

an acquiring module 410, configured to acquire left-channel audio data and right-channel audio data of target audio in the process of playing the target audio;

a determining module 420, configured to determine, according to a sampling frequency of the target audio, a preset number of frequency sub-bands corresponding to the sampling frequency;

a filtering module 430, configured to perform polyphase filtering on the left-channel audio data to partition the left-channel audio data into the preset number of frequency sub-bands, and perform polyphase filtering on the right-channel audio data to partition the right-channel audio data into the preset number of frequency sub-bands;

a synthesizing module 440, configured to synthesize, according to left-channel calibration parameter values corresponding to the preset number of frequency sub-bands respectively, the left-channel audio data partitioned into the preset number of frequency sub-bands, to obtain left-channel audio data to be played, and synthesize, according to right-channel calibration parameter values corresponding to the preset number of frequency sub-bands respectively, the right-channel audio data partitioned into the preset number of frequency sub-bands, to obtain right-channel audio data to be played; and a playing module 450, configured to play, over a left channel, the left-channel audio data to be played, and play, over a right channel, the right-channel audio data to be played.

Optionally, the acquiring module 410 is configured to:

cache the left-channel audio data and the right-channel audio data in the target audio; and acquire currently-cached left-channel audio data and currently-cached right-channel audio data when the data amount of each of the cached left-channel audio data and the cached right-channel audio data in the target audio reaches a first preset value.

Optionally, the filtering module 430 is configured to:

window the left-channel audio data to obtain windowed left-channel audio data and window the right-channel audio data to obtain windowed right-channel audio data based on a preset window function; and perform polyphase filtering on the windowed left-channel audio data to partition the windowed left-channel audio data into the preset number of frequency sub-bands, and perform polyphase filtering on the windowed right-channel audio data to partition the windowed right-channel audio data into the preset number of frequency sub-bands; and the synthesizing module 440 is configured to:

synthesize, according to left-channel calibration parameter values corresponding to the preset number of frequency sub-bands respectively, the windowed left-channel audio data partitioned into the preset number of frequency sub-bands, to obtain synthesized left-channel audio data, and based on a preset inverse window function, inversely window the synthesized left-channel audio data to obtain left-channel audio data to be played; and synthesize, according to right-channel calibration parameter values corresponding to the preset number of frequency sub-bands respectively, the windowed right-channel audio data partitioned into the preset number of frequency sub-bands, to obtain synthesized right-channel audio data, and based on the preset inverse window function, inversely window the synthesized right-channel audio data to obtain the right-channel audio data to be played.

Optionally, the synthesizing module 440 is configured to:

for each frequency sub-band in the preset number of frequency sub-bands, multiply the left-channel calibration parameter value corresponding to the frequency sub-band by the left-channel audio data partitioned into the frequency sub-band to obtain calibrated left-channel audio data at the frequency sub-band, and multiply the right-channel calibration parameter value corresponding to the frequency sub-band by the right-channel audio data partitioned into the frequency sub-band to obtain calibrated right-channel audio data at the frequency sub-band; and synthesize the calibrated left-channel audio data at the preset number of frequency sub-bands to obtain left-channel audio data to be played, and synthesize the calibrated right-channel audio data at the preset number of frequency sub-bands to obtain the right-channel audio data to be played.

Optionally, the playing module 450 is further configured to:

play first preset audio data in a first preset frequency range over the left channel and the right channel simultaneously.

Figure 5:
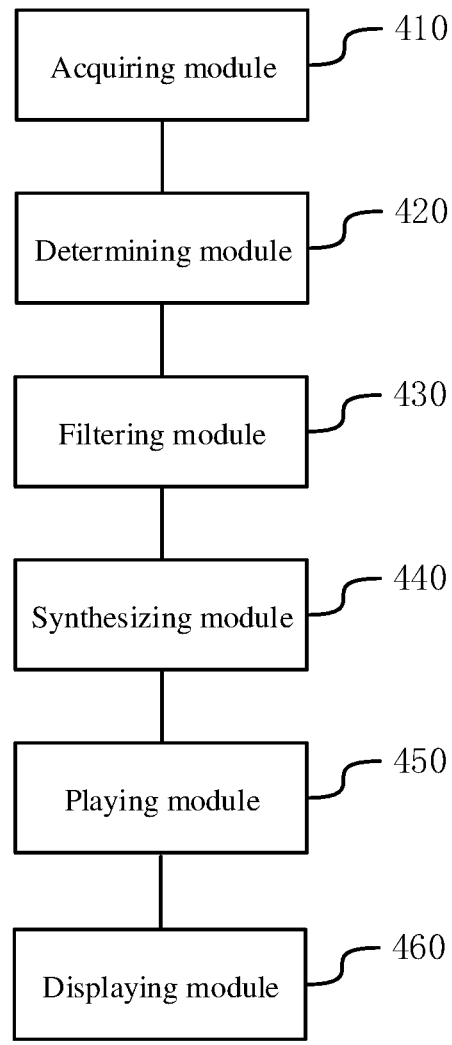
FIG. 5 is a schematic structural diagram of an apparatus for playing audio data according to an embodiment of the present disclosure.

As shown in FIG. 5, the apparatus further includes:

a displaying module 460 for displaying an adjustment slider of an adjustment parameter, wherein the first preset audio data is single-channel audio data; wherein the determining module 420 is further configured to:

when a determining instruction corresponding to the adjustment slider is detected, determine, according to a position of an adjustment pointer on the adjustment slider, a left-channel adjustment parameter value and a right-channel adjustment parameter value which correspond to the first preset frequency range; and for a first frequency sub-band whose frequency range is the first preset frequency range in the preset number of frequency sub-bands, determine a left-channel calibration parameter value and a right-channel calibration parameter value which correspond to the first frequency sub-band, according to a left-channel adjustment coefficient and a right-channel adjustment coefficient which correspond to the first frequency sub-band, and the left-channel adjustment parameter value and the right-channel adjustment parameter value which correspond to the first preset frequency range.

Optionally, the playing module 450 is further configured to:

play second preset audio data in a second preset frequency range over the left channel and the right channel simultaneously, and the display module is further configured to display an adjustment slider of an adjustment parameter, wherein the second preset audio data is single-channel audio data; and the determining module 420 is further configured to:

when a determining instruction corresponding to the adjustment slider is detected, determine, according to a position of an adjustment pointer on the adjustment slider, a left-channel adjustment parameter value and a right-channel adjustment parameter value which correspond to the second preset frequency range; and for a second frequency sub-band in other frequency sub-bands, except the first frequency sub-band, in the preset number of frequency sub-bands, determine a left-channel calibration parameter value and a right-channel calibration parameter value which correspond to the second frequency sub-band, according to a left-channel adjustment coefficient and a right-channel adjustment coefficient which correspond to the second frequency sub-band, and the left-channel adjustment parameter value and the right-channel adjustment parameter value which correspond to the second preset frequency range, wherein the second frequency sub-band is any frequency sub-band in the other frequency sub-bands.

Optionally, the determining module 420 is further configured to:

multiply the left-channel adjustment coefficient corresponding to the second frequency sub-band by the left-channel adjustment parameter value corresponding to the second preset frequency range to obtain the left-channel calibration parameter value corresponding to the second frequency sub-band, and multiply the right-channel adjustment coefficient corresponding to the second frequency sub-band by the right-channel adjustment parameter value corresponding to the second preset frequency range to obtain the right-channel calibration parameter value corresponding to the second frequency sub-band.

Optionally, the synthesizing module 440 is configured to:

synthesize, according to the left-channel calibration parameter values corresponding to the preset number of frequency sub-bands respectively, the left-channel audio data partitioned into the preset number of frequency sub-bands, to obtain synthesized left-channel audio data, and multiply left-channel calibration parameter values corresponding to a third preset frequency range by the synthesized left-channel audio data to obtain the left-channel audio data to be played; and synthesize, according to the right-channel calibration parameter values corresponding to the preset number of frequency sub-bands respectively, the right-channel audio data partitioned into the preset number of frequency sub-bands, to obtain synthesized right-channel audio data and multiply right-channel calibration parameter values corresponding to the third preset frequency range by the synthesized right-channel audio data to obtain the right-channel audio data to be played.

Optionally, the first preset frequency range is a fundamental-tone frequency range, and the second preset frequency range is an overtone frequency range.

Optionally, the third preset frequency range is obtained by merging the fundamental-tone frequency range and the overtone frequency range.

Optionally, the preset number of frequency sub-bands are partitioned according to the fact that the difference between endpoint values of the frequency range corresponding to each frequency sub-band is a second preset value.

In the embodiment of the present disclosure, the audio is partitioned into a plurality of frequency sub-bands, and based on the left-channel calibration parameter values and the right-channel calibration parameter values of the different frequency sub-bands, the left-channel audio data at the respective frequency sub-bands and the right-channel audio data at the respective frequency sub-bands are respectively calibrated; and compared with the method which only adjusts the volume in the related art, the method for adjusting the balance between the left channel and the right channel is provided, which may better adjust the balance between the left channel and the right channel, and thus achieve a better audio data playing effect.

It should be noted that the apparatus for playing audio data according to the above embodiment is only illustrated by the division of various functional modules when playing audio data. In practical application, the above functions may be assigned to be implemented by different functional modules according to needs. That is, the internal structure of the apparatus is partitioned into different functional modules to implement all or a part of the functions described above. In addition, the apparatus for playing audio data according to the above embodiment and the method for playing audio data are based on the same inventive concept, and the specific implementation process of the apparatus is detailed in the method embodiment and is thus not repeatedly described herein.

Figure 6:
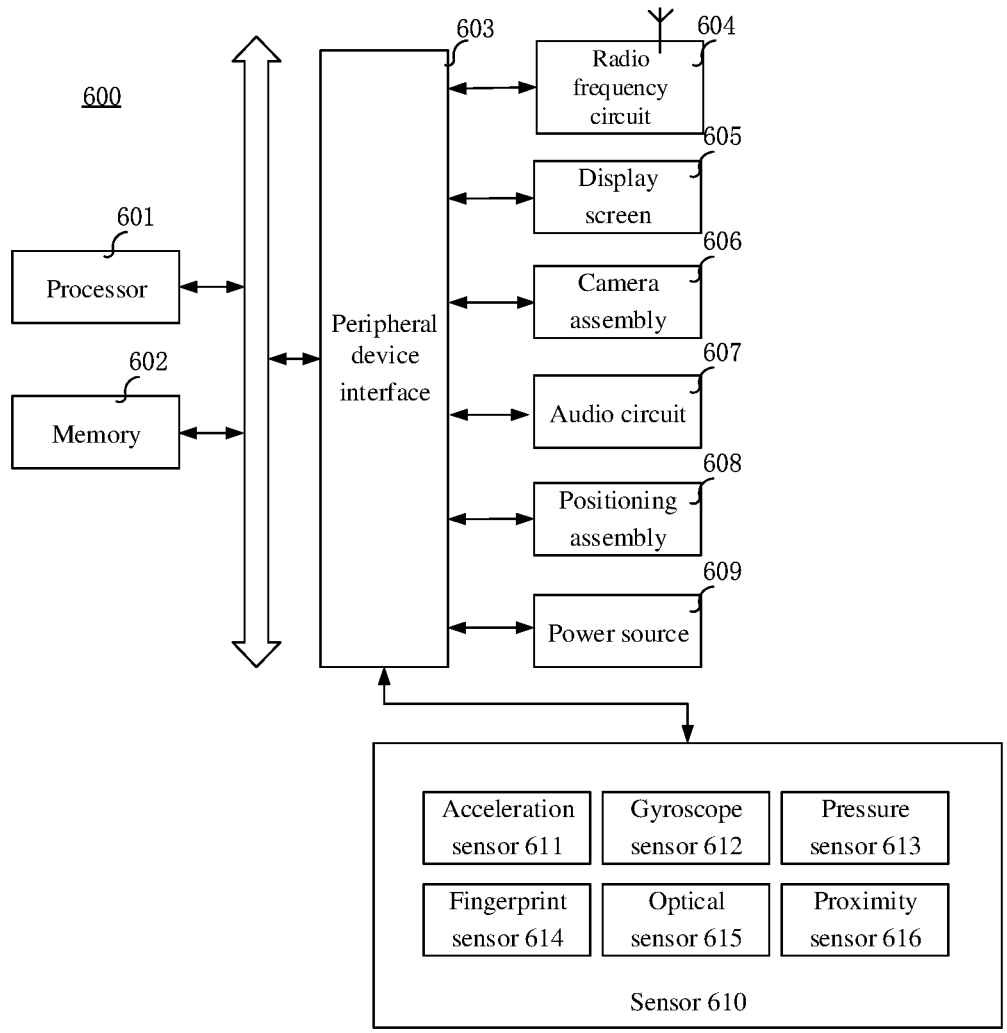
FIG. 6 is a schematic structural diagram of a terminal according to an embodiment of the present disclosure.

FIG. 6 is a structural block diagram of a terminal 600 according to an exemplary embodiment of the present disclosure. The terminal 600 may be a smart phone, a tablet computer, a Moving Picture Experts Group Audio Layer III (MP3) player, a Moving Picture Experts Group Audio Layer IV (MP4) player, or a laptop or desktop computer. The terminal 600 may also be referred to as a user equipment, a portable terminal, a laptop terminal, a desktop terminal, or the like Generally, the terminal 600 includes a processor 601 and a memory 602.

The processor 601 may include one or more processing cores, such as a 4-core processor, an 8-core processor, or the like. The processor 601 may be practiced by using at least one of hardware forms in a digital signal processor (DSP), a field-programmable gate array (FPGA) and a programmable logic array (PLA). The processor 601 may also include a main processor and a co-processor. The main processor is a processor for processing data in an awaken state, and is also called as a central processing unit (CPU). The co-processor is a low-power processor for processing data in a standby state. In some embodiments, the processor 601 may be integrated with a graphics processing unit (GPU) which is responsible for rendering and drawing of content required to be displayed by a display. In some embodiments, the processor 601 may also include an artificial intelligence (AI) processor for processing a calculation operation related to machine learning.

The memory 602 may include one or more computer-readable storage media which may be non-transitory. The memory 602 may also include a high-speed random-access memory, as well as a non-volatile memory, such as one or more disk storage devices and flash storage devices. In some embodiments, the non-transitory computer-readable storage medium in the memory 602 is configured to store at least one instruction which is executable by the processor 601 to implement the method for determining the karaoke singing score according to the embodiments of the present disclosure.

In some embodiments, the terminal 600 may optionally include a peripheral device interface 603 and at least one peripheral device. The processor 601, the memory 602 and the peripheral device interface 603 may be connected to each other via a bus or a signal line. The at least one peripheral device may be connected to the peripheral device interface 603 via a bus, a signal line or a circuit board. Specifically, the peripheral device includes at least one of a radio frequency circuit 604, a touch display screen 605, a camera assembly 606, an audio circuit 607, a positioning assembly 608 and a power source 609.

The peripheral device interface 603 may be configured to connect the at least one peripheral device related to input/output (I/O) to the processor 601 and the memory 602. In some embodiments, the processor 601, the memory 602 and the peripheral device interface 603 are integrated on the same chip or circuit board. In some other embodiments, any one or two of the processor 601, the memory 602 and the peripheral device interface 603 may be practiced on a separate chip or circuit board, which is not limited in this embodiment.

The radio frequency circuit 604 is configured to receive and transmit a radio frequency (RF) signal, which is also referred to as an electromagnetic signal. The radio frequency circuit 604 communicates with a communication network or another communication device via the electromagnetic signal. The radio frequency circuit 604 converts an electrical signal to an electromagnetic signal and sends the signal, or converts a received electromagnetic signal to an electrical signal. Optionally, the radio frequency circuit 604 includes an antenna system, an RF transceiver, one or a plurality of amplifiers, a tuner, an oscillator, a digital signal processor, a codec chip set, a subscriber identification module card or the like. The radio frequency circuit 604 may communicate with another terminal based on a wireless communication protocol. The wireless communication protocol includes, but not limited to: a metropolitan area network, generations of mobile communication networks (including 2G, 3G, 4G and 5G), a wireless local area network and/or a wireless fidelity (WiFi) network. In some embodiments, the radio frequency circuit 504 may further include a near field communication (NFC)-related circuits, which is not limited in the present disclosure.

The display screen 605 may be configured to display a user interface (UI). The UE may include graphics, texts, icons, videos and any combination thereof. When the display screen 605 is a touch display screen, the display screen 605 may further have the capability of acquiring a touch signal on a surface of the display screen 605 or above the surface of the display screen 605. The touch signal may be input to the processor 601 as a control signal, and further processed therein. In this case, the display screen 605 may be further configured to provide a virtual button and/or a virtual keyboard or keypad, also referred to as a soft button and/or a soft keyboard or keypad. In some embodiments, one display screen 605 may be provided, which is arranged on a front panel of the terminal 600. In some other embodiments, at least two display screens 605 are provided, which are respectively arranged on different surfaces of the terminal 600 or designed in a folded fashion. In still some other embodiments, the display screen 605 may be a flexible display screen, which is arranged on a bent surface or a folded surface of the terminal 600. Even, the display screen 605 may be further arranged to an irregular pattern which is non-rectangular, that is, a specially-shaped screen. The display screen 605 may be fabricated from such materials as a liquid crystal display (LCD), an organic light-emitting diode (OLED) and the like.

The camera assembly 606 is configured to capture an image or a video. Optionally, the camera assembly 606 includes a front camera and a rear camera. Generally, the front camera is arranged on a front panel of the terminal, and the rear camera is arranged on a rear panel of the terminal. In some embodiments, at least two rear cameras are arranged, which are respectively any one of a primary camera, a depth of field (DOF) camera, a wide-angle camera and a long-focus camera, such that the primary camera and the DOF camera are fused to implement the background virtualization function, and the primary camera and the wide-angle camera are fused to implement the panorama photographing and virtual reality (VR) photographing functions or other fused photographing functions. In some embodiments, the camera assembly 606 may further include a flash. The flash may be a single-color temperature flash or a double-color temperature flash. The double-color temperature flash refers to a combination of a warm-light flash and a cold-light flash, which may be used for light compensation under different color temperatures.

The audio circuit 607 may include a microphone and a speaker. The microphone is configured to capture an acoustic wave of a user and an environment, and convert the acoustic wave to an electrical signal and output the electrical signal to the processor 601 for further processing, or output to the radio frequency circuit 504 to implement voice communication. For the purpose of stereo capture or noise reduction, a plurality of such microphones may be provided, which are respectively arranged at different positions of the terminal 600. The microphone may also be a microphone array or an omnidirectional capturing microphone. The speaker is configured to convert an electrical signal from the processor 601 or the radio frequency circuit 604 to an acoustic wave. The speaker may be a traditional thin-film speaker, or may be a piezoelectric ceramic speaker. When the speaker is a piezoelectric ceramic speaker, an electrical signal may be converted to an acoustic wave audible by human beings, or an electrical signal may be converted to an acoustic wave inaudible by human beings for the purpose of ranging or the like. In some embodiments, the audio circuit 607 may further include a headphone plug.

The positioning assembly 608 is configured to determine a current geographical position of the terminal 600 to implement navigation or a local based service (LBS). The positioning assembly 608 may be the global positioning system (GPS) from the United States, the Beidou positioning system from China, the Grenas satellite positioning system from Russia or the Galileo satellite navigation system from the European Union.

The power source 609 is configured to supply power for the components in the terminal 600. The power source 609 may be an alternating current, a direct current, a disposable battery or a rechargeable battery. When the power source 609 includes a rechargeable battery, the rechargeable battery may support wired charging or wireless charging. The rechargeable battery may also support the supercharging technology.

In some embodiments, the terminal may further include one or a plurality of sensors 610. The one or plurality of sensors 610 include, but not limited to: an acceleration sensor 611, a gyroscope sensor 612, a pressure sensor 613, a fingerprint sensor 614, an optical sensor 615 and a proximity sensor 616.

The acceleration sensor 611 may detect accelerations on three coordinate axes in a coordinate system established for the terminal 600. For example, the acceleration sensor 611 may be configured to detect components of a gravity acceleration on the three coordinate axes. The processor 601 may control the touch display screen 605 to display the user interface in a horizontal view or a longitudinal view based on a gravity acceleration signal acquired by the acceleration sensor 611. The acceleration sensor 611 may be further configured to acquire motion data of a game or a user.

The gyroscope sensor 612 may detect a direction and a rotation angle of the terminal 600, and the gyroscope sensor 612 may collaborate with the acceleration sensor 611 to capture a 3D action performed by the user for the terminal 600. Based on the data acquired by the gyroscope sensor 612, the processor 601 may implement the following functions: action sensing (for example, modifying the UE based on an inclination operation of the user), image stabilization during the photographing, game control and inertial navigation.

The force sensor 613 may be arranged on a side frame of the terminal and/or on a lowermost layer of the touch display screen 605. When the force sensor 613 is arranged on the side frame of the terminal 600, a grip signal of the user against the terminal 600 may be detected, and the processor 601 implements left or right hand identification or perform a shortcut operation based on the grip signal acquired by the force sensor 613. When the force sensor 613 is arranged on the lowermost layer of the touch display screen 605, the processor 601 implement control of an operable control on the UI based on a force operation of the user against the touch display screen 605. The operable control includes at least one of a button control, a scroll bar control, an icon control, and a menu control.

The fingerprint sensor 614 is configured to acquire fingerprints of the user, and the processor 601 determines the identity of the user based on the fingerprints acquired by the fingerprint sensor 614, or the fingerprint sensor 614 determines the identity of the user based on the acquired fingerprints. When it is determined that the identify of the user is trustable, the processor 601 authorizes the user to perform related sensitive operations, wherein the sensitive operations include unlocking the screen, checking encrypted information, downloading software, paying and modifying settings and the like. The fingerprint sensor 614 may be arranged on a front face a back face or a side face of the terminal 600. When the terminal 600 is provided with a physical key or a manufacturer's logo, the fingerprint sensor 614 may be integrated with the physical key or the manufacturer's logo.

The optical sensor 615 is configured to acquire the intensity of ambient light. In one embodiment, the processor 601 may control a display luminance of the touch display screen 605 based on the intensity of ambient light acquired by the optical sensor 615. Specifically, when the intensity of ambient light is high, the display luminance of the touch display screen 605 is up-shifted; and when the intensity of ambient light is low, the display luminance of the touch display screen 605 is down-shifted. In another embodiment, the processor 601 may further dynamically adjust photographing parameters of the camera assembly 506 based on the intensity of ambient light acquired by the optical sensor.

The proximity sensor 616, also referred to as a distance sensor, is generally arranged on the front panel of the terminal 600. The proximity sensor 616 is configured to acquire a distance between the user and the front face of the terminal 600. In one embodiment, when the proximity sensor 616 detects that the distance between the user and the front face of the terminal 600 gradually decreases, the processor 601 controls the touch display screen 605 to switch from an active state to a rest state; and when the proximity sensor 616 detects that the distance between the user and the front face of the terminal 600 gradually increases, the processor 601 controls the touch display screen 605 to switch from the rest state to the active state.

A person skilled in the art may understand that the structure of the terminal as illustrated in FIG. 6 does not construe a limitation on the terminal 600. The terminal may include more components over those illustrated in FIG. 6, or combinations of some components, or employ different component deployments.

An embodiment of the present disclosure provides a terminal. The terminal includes: a processor and a memory; wherein the memory is configured to store at least one instruction;

the at least one instruction is configured to be executed by the processor to perform one of the following operations:

acquiring left-channel audio data and right-channel audio data of target audio in a process of playing the target audio;

determining, according to a sampling frequency of the target audio, a preset number of frequency sub-bands corresponding to the sampling frequency;

performing polyphase filtering on the left-channel audio data to partition the left-channel audio data into the preset number of frequency sub-bands, and performing polyphase filtering on the right-channel audio data to partition the right-channel audio data into the preset number of frequency sub-bands;

synthesizing, according to left-channel calibration parameter values corresponding to the preset number of frequency sub-bands respectively, the left-channel audio data partitioned into the preset number of frequency sub-bands, to obtain left-channel audio data to be played, and synthesizing, according to right-channel calibration parameter values corresponding to the preset number of frequency sub-bands respectively, the right-channel audio data partitioned into the preset number of frequency sub-bands, to obtain right-channel audio data to be played; and playing, over a left channel, the left-channel audio data to be played, and playing, over a right channel, the right-channel audio data to be played.

Optionally, the at least one instruction is further configured to be executed by the processor to perform one of the following operations:

caching the left-channel audio data and the right-channel audio data in the target audio; and acquiring currently-cached left-channel audio data and currently-cached right-channel audio data when the data amount of each of the cached left-channel audio data and the cached right-channel audio data in the target audio reaches a first preset value.

Optionally, the at least one instruction is further configured to be executed by the processor to perform one of the following operation:

windowing the left-channel audio data to obtain windowed left-channel audio data and windowing the right-channel audio data to obtain windowed right-channel audio data based on a preset window function; and performing polyphase filtering on the windowed left-channel audio data to partition the windowed left-channel audio data into the preset number of frequency sub-bands, and performing polyphase filtering on the windowed right-channel audio data to partition the windowed right-channel audio data into the preset number of frequency sub-bands, and the at least one instruction is further configured to be executed by the processor to perform one of the following operation:

synthesizing, according to the left-channel calibration parameter values corresponding to the preset number of frequency sub-bands respectively, the windowed left-channel audio data partitioned into the preset number of frequency sub-bands, to obtain synthesized left-channel audio data, and based on a preset inverse window function, inversely windowing the synthesized left-channel audio data to obtain the left-channel audio data to be played; and synthesizing, according to the right-channel calibration parameter values corresponding to the preset number of frequency sub-bands respectively, the windowed right-channel audio data partitioned into the preset number of frequency sub-bands, to obtain synthesized right-channel audio data, and based on the preset inverse window function, inversely windowing the synthesized right-channel audio data to obtain the right-channel audio data to be played.

Optionally, the at least one instruction is further configured to be executed by the processor to perform one of the following operations:

for each frequency sub-band in the preset number of frequency sub-bands, multiplying the left-channel calibration parameter value corresponding to the frequency sub-band by the left-channel audio data partitioned into the frequency sub-band to obtain calibrated left-channel audio data at the frequency sub-band, and multiplying the right-channel calibration parameter value corresponding to the frequency sub-band by the right-channel audio data partitioned into the frequency sub-band to obtain calibrated right-channel audio data at the frequency sub-band; and synthesizing the calibrated left-channel audio data at the preset number of frequency sub-bands to obtain the left-channel audio data to be played, and synthesizing the calibrated right-channel audio data at the preset number of frequency sub-bands to obtain the right-channel audio data to be played.

Optionally, the at least one instruction is further configured to be executed by the processor to perform one of the following operations:

playing first preset audio data in a first preset frequency range over the left channel and the right channel simultaneously, and displaying an adjustment slider of an adjustment parameter, wherein the first preset audio data is single-channel audio data;

when a determining instruction corresponding to the adjustment slider is detected, determining, according to a position of an adjustment pointer on the adjustment slider, a left-channel adjustment parameter value and a right-channel adjustment parameter value which correspond to the first preset frequency range; and for a first frequency sub-band whose frequency range is the first preset frequency range in the preset number of frequency sub-bands, determining a left-channel calibration parameter value and a right-channel calibration parameter value which correspond to the first frequency sub-band, according to a left-channel adjustment coefficient and a right-channel adjustment coefficient which correspond to the first frequency sub-band, and the left-channel adjustment parameter value and the right-channel adjustment parameter value which correspond to the first preset frequency range.

Optionally, the at least one instruction is further configured to be executed by the processor to perform one of the following operations:

playing second preset audio data in a second preset frequency range over the left channel and the right channel simultaneously, and displaying an adjustment slider of an adjustment parameter, wherein the second preset audio data is single-channel audio data;

when a determining instruction corresponding to the adjustment slider is detected, determining, according to a position of an adjustment pointer on the adjustment slider, a left-channel adjustment parameter value and a right-channel adjustment parameter value which correspond to the second preset frequency range; and for a second frequency sub-band in other frequency sub-bands, except the first frequency sub-band, in the preset number of frequency sub-bands, determining a left-channel calibration parameter value and a right-channel calibration parameter value which correspond to the second frequency sub-band, according to a left-channel adjustment coefficient and a right-channel adjustment coefficient which correspond to the second frequency sub-band, and the left-channel adjustment parameter value and the right-channel adjustment parameter value which correspond to the second preset frequency range, wherein the second frequency sub-band is any frequency sub-band in the other frequency sub-bands.

Optionally, the at least one instruction is further configured to be executed by the processor to perform one of the following operations:

multiplying the left-channel adjustment coefficient corresponding to the second frequency sub-band by the left-channel adjustment parameter value corresponding to the second preset frequency range to obtain the left-channel calibration parameter value corresponding to the second frequency sub-band, and multiplying the right-channel adjustment coefficient corresponding to the second frequency sub-band by the right-channel adjustment parameter value corresponding to the second preset frequency range to obtain the right-channel calibration parameter value corresponding to the second frequency sub-band.

Optionally, the at least one instruction is further configured to be executed by the processor to perform one of the following operations:

synthesizing, according to the left-channel calibration parameter values corresponding to the preset number of frequency sub-bands respectively, the left-channel audio data partitioned into the preset number of frequency sub-bands, to obtain synthesized left-channel audio data, and multiplying left-channel calibration parameter values corresponding to a third preset frequency range by the synthesized left-channel audio data to obtain the left-channel audio data to be played; and synthesizing, according to the right-channel calibration parameter values corresponding to the preset number of frequency sub-bands respectively, the right-channel audio data partitioned into the preset number of frequency sub-bands, to obtain synthesized right-channel audio data and multiplying right-channel calibration parameter values corresponding to the third preset frequency range by the synthesized right-channel audio data to obtain the right-channel audio data to be played.

Optionally, the first preset frequency range is a fundamental-tone frequency range, and the second preset frequency range is an overtone frequency range.

Optionally, the third preset frequency range is obtained by merging the fundamental-tone frequency range and the overtone frequency range.

An embodiment of the present disclosure provides a computer-readable storage medium. At least one instruction is stored in the storage medium and the at least one instruction is loaded and executed by a processor to perform the following operations:

acquiring left-channel audio data and right-channel audio data of target audio in a process of playing the target audio;

determining, according to a sampling frequency of the target audio, a preset number of frequency sub-bands corresponding to the sampling frequency;

performing polyphase filtering on the left-channel audio data to partition the left-channel audio data into the preset number of frequency sub-bands, and performing polyphase filtering on the right-channel audio data to partition the right-channel audio data into the preset number of frequency sub-bands;

synthesizing, according to left-channel calibration parameter values corresponding to the preset number of frequency sub-bands respectively, the left-channel audio data partitioned into the preset number of frequency sub-bands, to obtain left-channel audio data to be played, and synthesizing, according to right-channel calibration parameter values corresponding to the preset number of frequency sub-bands respectively, the right-channel audio data partitioned into the preset number of frequency sub-bands, to obtain right-channel audio data to be played; and playing, over a left channel, the left-channel audio data to be played, and playing, over a right channel, the right-channel audio data to be played.

Optionally, the at least one instruction is further configured to be executed by the processor to perform one of the following operations:

caching the left-channel audio data and the right-channel audio data in the target audio; and acquiring currently-cached left-channel audio data and currently-cached right-channel audio data when the data amount of each of the cached left-channel audio data and the cached right-channel audio data in the target audio reaches a first preset value.

Optionally, the at least one instruction is further configured to be executed by the processor to perform one of the following operation:

windowing the left-channel audio data to obtain windowed left-channel audio data and windowing the right-channel audio data to obtain windowed right-channel audio data based on a preset window function; and performing polyphase filtering on the windowed left-channel audio data to partition the windowed left-channel audio data into the preset number of frequency sub-bands, and performing polyphase filtering on the windowed right-channel audio data to partition the windowed right-channel audio data into the preset number of frequency sub-bands, and the at least one instruction is further configured to be executed by the processor to perform one of the following operation:

synthesizing, according to the left-channel calibration parameter values corresponding to the preset number of frequency sub-bands respectively, the windowed left-channel audio data partitioned into the preset number of frequency sub-bands, to obtain synthesized left-channel audio data, and based on a preset inverse window function, inversely windowing the synthesized left-channel audio data to obtain the left-channel audio data to be played; and synthesizing, according to the right-channel calibration parameter values corresponding to the preset number of frequency sub-bands respectively, the windowed right-channel audio data partitioned into the preset number of frequency sub-bands, to obtain synthesized right-channel audio data, and based on the preset inverse window function, inversely windowing the synthesized right-channel audio data to obtain the right-channel audio data to be played.

Optionally, the at least one instruction is further configured to be executed by the processor to perform one of the following operations:

for each frequency sub-band in the preset number of frequency sub-bands, multiplying the left-channel calibration parameter value corresponding to the frequency sub-band by the left-channel audio data partitioned into the frequency sub-band to obtain calibrated left-channel audio data at the frequency sub-band, and multiplying the right-channel calibration parameter value corresponding to the frequency sub-band by the right-channel audio data partitioned into the frequency sub-band to obtain calibrated right-channel audio data at the frequency sub-band; and synthesizing the calibrated left-channel audio data at the preset number of frequency sub-bands to obtain the left-channel audio data to be played, and synthesizing the calibrated right-channel audio data at the preset number of frequency sub-bands to obtain the right-channel audio data to be played.

Optionally, the at least one instruction is further configured to be executed by the processor to perform one of the following operations:

playing first preset audio data in a first preset frequency range over the left channel and the right channel simultaneously, and displaying an adjustment slider of an adjustment parameter, wherein the first preset audio data is single-channel audio data;

when a determining instruction corresponding to the adjustment slider is detected, determining, according to a position of an adjustment pointer on the adjustment slider, a left-channel adjustment parameter value and a right-channel adjustment parameter value which correspond to the first preset frequency range; and for a first frequency sub-band whose frequency range is the first preset frequency range in the preset number of frequency sub-bands, determining a left-channel calibration parameter value and a right-channel calibration parameter value which correspond to the first frequency sub-band, according to a left-channel adjustment coefficient and a right-channel adjustment coefficient which correspond to the first frequency sub-band, and the left-channel adjustment parameter value and the right-channel adjustment parameter value which correspond to the first preset frequency range.

Optionally, the at least one instruction is further configured to be executed by the processor to perform one of the following operations:

playing second preset audio data in a second preset frequency range over the left channel and the right channel simultaneously, and displaying an adjustment slider of an adjustment parameter, wherein the second preset audio data is single-channel audio data;

when a determining instruction corresponding to the adjustment slider is detected, determining, according to a position of an adjustment pointer on the adjustment slider, a left-channel adjustment parameter value and a right-channel adjustment parameter value which correspond to the second preset frequency range; and for a second frequency sub-band in other frequency sub-bands, except the first frequency sub-band, in the preset number of frequency sub-bands, determining a left-channel calibration parameter value and a right-channel calibration parameter value which correspond to the second frequency sub-band, according to a left-channel adjustment coefficient and a right-channel adjustment coefficient which correspond to the second frequency sub-band, and the left-channel adjustment parameter value and the right-channel adjustment parameter value which correspond to the second preset frequency range, wherein the second frequency sub-band is any frequency sub-band in the other frequency sub-bands.

Optionally, the at least one instruction is further configured to be executed by the processor to perform one of the following operations:

multiplying the left-channel adjustment coefficient corresponding to the second frequency sub-band by the left-channel adjustment parameter value corresponding to the second preset frequency range to obtain the left-channel calibration parameter value corresponding to the second frequency sub-band, and multiplying the right-channel adjustment coefficient corresponding to the second frequency sub-band by the right-channel adjustment parameter value corresponding to the second preset frequency range to obtain the right-channel calibration parameter value corresponding to the second frequency sub-band.

Optionally, the at least one instruction is further configured to be executed by the processor to perform one of the following operations:

synthesizing, according to the left-channel calibration parameter values corresponding to the preset number of frequency sub-bands respectively, the left-channel audio data partitioned into the preset number of frequency sub-bands, to obtain synthesized left-channel audio data, and multiplying left-channel calibration parameter values corresponding to a third preset frequency range by the synthesized left-channel audio data to obtain the left-channel audio data to be played; and synthesizing, according to the right-channel calibration parameter values corresponding to the preset number of frequency sub-bands respectively, the right-channel audio data partitioned into the preset number of frequency sub-bands, to obtain synthesized right-channel audio data and multiplying right-channel calibration parameter values corresponding to the third preset frequency range by the synthesized right-channel audio data to obtain the right-channel audio data to be played.

the first preset frequency range is a fundamental-tone frequency range, and the second preset frequency range is an overtone frequency range.

Optionally, the third preset frequency range is obtained by merging the fundamental-tone frequency range and the overtone frequency range.

Persons of ordinary skill in the art may understand that all or part of the steps described in the above embodiments may be completed by hardware, or by relevant hardware instructed by applications stored in a non-transitory computer readable storage medium, such as a read-only memory, a disk or a CD.

Described above are merely optional embodiments of the present disclosure, and are not intended to limit the present disclosure. Within the spirit and principles of the disclosure, any modifications, equivalent substitutions, or improvements fall within the protection scope of the present disclosure.

What is claimed is:

1. A method for playing audio data, comprising:
acquiring left-channel audio data and right-channel audio data of target audio in a process of playing the target audio;
determining, according to a sampling frequency of the target audio, a preset number of frequency sub-bands corresponding to the sampling frequency;
performing polyphase filtering on the left-channel audio data to partition the left-channel audio data into the preset number of frequency sub-bands, and performing polyphase filtering on the right-channel audio data to partition the right-channel audio data into the preset number of frequency sub-bands;
synthesizing, according to left-channel calibration parameter values corresponding to the preset number of frequency sub-bands respectively, the left-channel audio data partitioned into the preset number of frequency sub-bands, to obtain left-channel audio data to be played, and synthesizing, according to right-channel calibration parameter values corresponding to the preset number of frequency sub-bands respectively, the right-channel audio data partitioned into the preset number of frequency sub-bands, to obtain right-channel audio data to be played; an playing, over a left channel, the left-channel audio data to be played, and playing, over a right channel, the right-channel audio data to be played, wherein the method further comprises:

playing first preset audio data in a first preset frequency range over the left channel and the right channel simultaneously, and displaying an adjustment slider of an adjustment parameter, wherein the first preset audio data is single-channel audio data;

when a determining instruction corresponding to the adjustment slider is detected, determining, according to a position of an adjustment pointer on the adjustment slider, a left-channel adjustment parameter value and a right-channel adjustment parameter value which correspond to the first preset frequency range; and for a first frequency sub-band whose frequency range is the first preset frequency range in the preset number of frequency sub-bands, determining a left-channel calibration parameter value and a right-channel calibration parameter value which correspond to the first frequency sub-band, according to a left-channel adjustment coefficient and a right-channel adjustment coefficient which correspond to the first frequency sub-band, and the left-channel adjustment parameter value and the right-channel adjustment parameter value which correspond to the first preset frequency range, and wherein the left-channel calibration parameter values corresponding to the preset number of frequency sub-bands comprise the left-channel calibration parameter value which corresponds to the first frequency sub-band, and the right-channel calibration parameter values corresponding to the preset number of frequency sub-bands comprise the right-channel calibration parameter value which corresponds to the first frequency sub-band.

2. The method according to claim 1, wherein the acquiring left-channel audio data and right-channel audio data in the target audio comprises:

caching the left-channel audio data and the right-channel audio data in the target audio; and acquiring currently-cached left-channel audio data and currently-cached right-channel audio data when the data amount of each of the cached left-channel audio data and the cached right-channel audio data in the target audio reaches a first preset value.

3. The method according to claim 1, wherein the performing polyphase filtering on the left-channel audio data to partition the left-channel audio data into the preset number of frequency sub-bands, and performing polyphase filtering on the right-channel audio data to partition the right-channel audio data into the preset number of frequency sub-bands comprises:

windowing the left-channel audio data to obtain windowed left-channel audio data and windowing the right-channel audio data to obtain windowed right-channel audio data based on a preset window function; and performing polyphase filtering on the windowed left-channel audio data to partition the windowed left-channel audio data into the preset number of frequency sub-bands, and performing polyphase filtering on the windowed right-channel audio data to partition the windowed right-channel audio data into the preset number of frequency sub-bands, and the synthesizing, according to left-channel calibration parameter values corresponding to the preset number of frequency sub-bands respectively, the left-channel audio data partitioned into the preset number of frequency sub-bands, to obtain left-channel audio data to be played, and synthesizing, according to right-channel calibration parameter values corresponding to the preset number of frequency sub-bands respectively, the right-channel audio data partitioned into the preset number of frequency sub-bands, to obtain right-channel audio data to be played comprises:

synthesizing, according to the left-channel calibration parameter values corresponding to the preset number of frequency sub-bands respectively, the windowed left-channel audio data partitioned into the preset number of frequency sub-bands, to obtain synthesized left-channel audio data, and based on a preset inverse window function, inversely windowing the synthesized left-channel audio data to obtain the left-channel audio data to be played; and synthesizing, according to the right-channel calibration parameter values corresponding to the preset number of frequency sub-bands respectively, the windowed right-channel audio data partitioned into the preset number of frequency sub-bands, to obtain synthesized right-channel audio data, and based on the preset inverse window function, inversely windowing the synthesized right-channel audio data to obtain the right-channel audio data to be played.

4. The method according to claim 1, wherein the synthesizing, according to left-channel calibration parameter values corresponding to the preset number of frequency sub-bands respectively, the left-channel audio data partitioned into the preset number of frequency sub-bands, to obtain left-channel audio data to be played, and synthesizing, according to right-channel calibration parameter values corresponding to the preset number of frequency sub-bands respectively, the right-channel audio data partitioned into the preset number of frequency sub-bands, to obtain right-channel audio data to be played comprises:

for each frequency sub-band in the preset number of frequency sub-bands, multiplying the left-channel calibration parameter value corresponding to the frequency sub-band by the left-channel audio data partitioned into the frequency sub-band to obtain calibrated left-channel audio data at the frequency sub-band, and multiplying the right-channel calibration parameter value corresponding to the frequency sub-band by the right-channel audio data partitioned into the frequency sub-band to obtain calibrated right-channel audio data at the frequency sub-band; and synthesizing the calibrated left-channel audio data at the preset number of frequency sub-bands to obtain the left-channel audio data to be played, and synthesizing the calibrated right-channel audio data at the preset number of frequency sub-bands to obtain the right-channel audio data to be played.

5. The method according to claim 1, further comprising:

playing second preset audio data in a second preset frequency range over the left channel and the right channel simultaneously, and displaying an adjustment slider of an adjustment parameter, wherein the second preset audio data is single-channel audio data;

when a determining instruction corresponding to the adjustment slider is detected, determining, according to a position of an adjustment pointer on the adjustment slider, a left-channel adjustment parameter value and a right-channel adjustment parameter value which correspond to the second preset frequency range; and for a second frequency sub-band in other frequency sub-bands, except the first frequency sub-band, in the preset number of frequency sub-bands, determining a left-channel calibration parameter value and a right-channel calibration parameter value which correspond to the second frequency sub-band, according to a left-channel adjustment coefficient and a right-channel adjustment coefficient which correspond to the second frequency sub-band, and the left-channel adjustment parameter value and the right-channel adjustment parameter value which correspond to the second preset frequency range, wherein the second frequency sub-band is any frequency sub-band in the other frequency sub-bands.

6. The method according to claim 5, wherein the determining a left-channel calibration parameter value and a right-channel calibration parameter value which correspond to the second frequency sub-band, according to a left-channel adjustment coefficient and a right-channel adjustment coefficient which correspond to the second frequency sub-band, and the left-channel adjustment parameter value and the right-channel adjustment parameter value which correspond to the second preset frequency range comprises:

multiplying the left-channel adjustment coefficient corresponding to the second frequency sub-band by the left-channel adjustment parameter value corresponding to the second preset frequency range to obtain the left-channel calibration parameter value corresponding to the second frequency sub-band, and multiplying the right-channel adjustment coefficient corresponding to the second frequency sub-band by the right-channel adjustment parameter value corresponding to the second preset frequency range to obtain the right-channel calibration parameter value corresponding to the second frequency sub-band.

7. The method according to claim 1, wherein the synthesizing, according to left-channel calibration parameter values corresponding to the preset number of frequency sub-bands respectively, the left-channel audio data partitioned into the preset number of frequency sub-bands, to obtain left-channel audio data to be played, and synthesizing, according to right-channel calibration parameter values corresponding to the preset number of frequency sub-bands respectively, the right-channel audio data partitioned into the preset number of frequency sub-bands, to obtain right-channel audio data to be played comprises:

synthesizing, according to the left-channel calibration parameter values corresponding to the preset number of frequency sub-bands respectively, the left-channel audio data partitioned into the preset number of frequency sub-bands, to obtain synthesized left-channel audio data, and multiplying left-channel calibration parameter values corresponding to a third preset frequency range by the synthesized left-channel audio data to obtain the left-channel audio data to be played; and synthesizing, according to the right-channel calibration parameter values corresponding to the preset number of frequency sub-bands respectively, the right-channel audio data partitioned into the preset number of frequency sub-bands, to obtain synthesized right-channel audio data and multiplying right-channel calibration parameter values corresponding to the third preset frequency range by the synthesized right-channel audio data to obtain the right-channel audio data to be played.

8. The method according to claim 5, wherein the first preset frequency range is a fundamental-tone frequency range, and the second preset frequency range is an overtone frequency range.

9. The method according to claim 7, wherein the third preset frequency range is obtained by merging the fundamental-tone frequency range and the overtone frequency range.

10. A terminal, comprising: a processor and a memory;
wherein the memory is configured to store at least one instruction;
the at least one instruction is configured to be executed by the processor to perform one of the following operations:
acquiring left-channel audio data and right-channel audio data of target audio in a process of playing the target audio;
determining, according to a sampling frequency of the target audio, a preset number of frequency sub-bands corresponding to the sampling frequency;
performing polyphase filtering on the left-channel audio data to partition the left-channel audio data into the preset number of frequency sub-bands, and performing polyphase filtering on the right-channel audio data to partition the right-channel audio data into the preset number of frequency sub-bands;
synthesizing, according to left-channel calibration parameter values corresponding to the preset number of frequency sub-bands respectively, the left-channel audio data partitioned into the preset number of frequency sub-bands, to obtain left-channel audio data to be played, and synthesizing, according to right-channel calibration parameter values corresponding to the preset number of frequency sub-bands respectively, the right-channel audio data partitioned into the preset number of frequency sub-bands, to obtain right-channel audio data to be played; and
playing, over a left channel, the left-channel audio data to be played, and playing, over a right channel, the right-channel audio data to be played,
wherein the at least one instruction is further configured to be executed by the processor to perform the following operations:
playing first preset audio data in a first preset frequency range over the left channel and the right channel simultaneously, and displaying an adjustment slider of an adjustment parameter, wherein the first preset audio data is single-channel audio data;
when a determining instruction corresponding to the adjustment slider is detected, determining, according to a position of an adjustment pointer on the adjustment slider, a left-channel adjustment parameter value and a right-channel adjustment parameter value which correspond to the first preset frequency range; and
for a first frequency sub-band whose frequency range is the first preset frequency range in the preset number of frequency sub-bands, determining a left-channel calibration parameter value and a right-channel calibration parameter value which correspond to the first frequency sub-band, according to a left-channel adjustment coefficient and a right-channel adjustment coefficient which correspond to the first frequency sub-band, and the left-channel adjustment parameter value and the right-channel adjustment parameter value which correspond to the first preset frequency range, and
wherein the left-channel calibration parameter values corresponding to the preset number of frequency sub-bands comprise the left-channel calibration parameter value which corresponds to the first frequency sub-band, and the right-channel calibration parameter values corresponding to the preset number of frequency sub-bands comprise the right-channel calibration parameter value which corresponds to the first frequency sub-band.

11. The terminal according to claim 10, wherein the at least one instruction is further configured to be executed by the processor to perform one of the following operations:
caching the left-channel audio data and the right-channel audio data in the target audio; and
acquiring currently-cached left-channel audio data and currently-cached right-channel audio data when the data amount of each of the cached left-channel audio data and the cached right-channel audio data in the target audio reaches a first preset value.

12. The terminal according to claim 10, wherein the at least one instruction is further configured to be executed by the processor to perform one of the following operation:
windowing the left-channel audio data to obtain windowed left-channel audio data and windowing the right-channel audio data to obtain windowed right-channel audio data based on a preset window function; and performing polyphase filtering on the windowed left-channel audio data to partition the windowed left-channel audio data into the preset number of frequency sub-bands, and performing polyphase filtering on the windowed right-channel audio data to partition the windowed right-channel audio data into the preset number of frequency sub-bands, and
the at least one instruction is further configured to be executed by the processor to perform one of the following operation:
synthesizing, according to the left-channel calibration parameter values corresponding to the preset number of frequency sub-bands respectively, the windowed left-channel audio data partitioned into the preset number of frequency sub-bands, to obtain synthesized left-channel audio data, and based on a preset inverse window function, inversely windowing the synthesized left-channel audio data to obtain the left-channel audio data to be played; and synthesizing, according to the right-channel calibration parameter values corresponding to the preset number of frequency sub-bands respectively, the windowed right-channel audio data partitioned into the preset number of frequency sub-bands, to obtain synthesized right-channel audio data, and based on the preset inverse window function, inversely windowing the synthesized right-channel audio data to obtain the right-channel audio data to be played.

13. The terminal according to claim 10, wherein the at least one instruction is further configured to be executed by the processor to perform one of the following operations:
for each frequency sub-band in the preset number of frequency sub-bands, multiplying the left-channel calibration parameter value corresponding to the frequency sub-band by the left-channel audio data partitioned into the frequency sub-band to obtain calibrated left-channel audio data at the frequency sub-band, and multiplying the right-channel calibration parameter value corresponding to the frequency sub-band by the right-channel audio data partitioned into the frequency sub-band to obtain calibrated right-channel audio data at the frequency sub-band; and
synthesizing the calibrated left-channel audio data at the preset number of frequency sub-bands to obtain the left-channel audio data to be played, and synthesizing the calibrated right-channel audio data at the preset number of frequency sub-bands to obtain the right-channel audio data to be played.

14. The terminal according to claim 10, wherein the at least one instruction is further configured to be executed by the processor to perform one of the following operations:
playing second preset audio data in a second preset frequency range over the left channel and the right channel simultaneously, and displaying an adjustment slider of an adjustment parameter, wherein the second preset audio data is single-channel audio data;
when a determining instruction corresponding to the adjustment slider is detected, determining, according to a position of an adjustment pointer on the adjustment slider, a left-channel adjustment parameter value and a right-channel adjustment parameter value which correspond to the second preset frequency range; and
for a second frequency sub-band in other frequency sub-bands, except the first frequency sub-band, in the preset number of frequency sub-bands, determining a left-channel calibration parameter value and a right-channel calibration parameter value which correspond to the second frequency sub-band, according to a left-channel adjustment coefficient and a right-channel adjustment coefficient which correspond to the second frequency sub-band, and the left-channel adjustment parameter value and the right-channel adjustment parameter value which correspond to the second preset frequency range, wherein the second frequency sub-band is any frequency sub-band in the other frequency sub-bands.

15. The terminal according to claim 14, wherein the at least one instruction is further configured to be executed by the processor to perform one of the following operations:
multiplying the left-channel adjustment coefficient corresponding to the second frequency sub-band by the left-channel adjustment parameter value corresponding to the second preset frequency range to obtain the left-channel calibration parameter value corresponding to the second frequency sub-band, and multiplying the right-channel adjustment coefficient corresponding to the second frequency sub-band by the right-channel adjustment parameter value corresponding to the second preset frequency range to obtain the right-channel calibration parameter value corresponding to the second frequency sub-band.

16. The terminal according to claim 10, wherein the at least one instruction is further configured to be executed by the processor to perform one of the following operations:
synthesizing, according to the left-channel calibration parameter values corresponding to the preset number of frequency sub-bands respectively, the left-channel audio data partitioned into the preset number of frequency sub-bands, to obtain synthesized left-channel audio data, and multiplying left-channel calibration parameter values corresponding to a third preset frequency range by the synthesized left-channel audio data to obtain the left-channel audio data to be played; and synthesizing, according to the right-channel calibration parameter values corresponding to the preset number of frequency sub-bands respectively, the right-channel audio data partitioned into the preset number of frequency sub-bands, to obtain synthesized right-channel audio data and multiplying right-channel calibration parameter values corresponding to the third preset frequency range by the synthesized right-channel audio data to obtain the right-channel audio data to be played.

17. The terminal according to claim 14, wherein the first preset frequency range is a fundamental-tone frequency range, and the second preset frequency range is an overtone frequency range.

18. A non-transitory computer-readable storage medium, wherein at least one instruction is stored in the storage medium and the at least one instruction is loaded and executed by a processor to perform the following operations:

acquiring left-channel audio data and right-channel audio data of target audio in a process of playing the target audio;

determining, according to a sampling frequency of the target audio, a preset number of frequency sub-bands corresponding to the sampling frequency;

performing polyphase filtering on the left-channel audio data to partition the left-channel audio data into the preset number of frequency sub-bands, and performing polyphase filtering on the right-channel audio data to partition the right-channel audio data into the preset number of frequency sub-bands;

synthesizing, according to left-channel calibration parameter values corresponding to the preset number of frequency sub-bands respectively, the left-channel audio data partitioned into the preset number of frequency sub-bands, to obtain left-channel audio data to be played, and synthesizing, according to right-channel calibration parameter values corresponding to the preset number of frequency sub-bands respectively, the right-channel audio data partitioned into the preset number of frequency sub-bands, to obtain right-channel audio data to be played; and playing, over a left channel, the left-channel audio data to be played, and playing, over a right channel, the right-channel audio data to be played, wherein the at least one instruction is further loaded and executed by a processor to perform the following operations:

playing first preset audio data in a first preset frequency range over the left channel and the right channel simultaneously, and displaying an adjustment slider of an adjustment parameter, wherein the first preset audio data is single-channel audio data;

when a determining instruction corresponding to the adjustment slider is detected, determining, according to a position of an adjustment pointer on the adjustment slider, a left-channel adjustment parameter value and a right-channel adjustment parameter value which correspond to the first preset frequency range; and for a first frequency sub-band whose frequency range is the first preset frequency range in the preset number of frequency sub-bands, determining a left-channel calibration parameter value and a right-channel calibration parameter value which correspond to the first frequency sub-band, according to a left-channel adjustment coefficient and a right-channel adjustment coefficient which correspond to the first frequency sub-band, and the left-channel adjustment parameter value and the right-channel adjustment parameter value which correspond to the first preset frequency range, and wherein the left-channel calibration parameter values corresponding to the preset number of frequency sub-bands comprise the left-channel calibration parameter value which corresponds to the first frequency sub-band, and the right-channel calibration parameter values corresponding to the preset number of frequency sub-bands comprise the right-channel calibration parameter value which corresponds to the first frequency sub-band.

19. The terminal according to claim 16, wherein the third preset frequency range is obtained by merging the fundamental-tone frequency range and the overtone frequency range.

20. The non-transitory computer-readable storage medium according to claim 18, wherein the at least one instruction is further loaded and executed by a processor to perform the following operations:

caching the left-channel audio data and the right-channel audio data in the target audio; and acquiring currently-cached left-channel audio data and currently-cached right-channel audio data when the data amount of each of the cached left-channel audio data and the cached right-channel audio data in the target audio reaches a first preset value.

* * * * *